(12) United States Patent
Francois et al.

(10) Patent No.: US 11,611,765 B2
(45) Date of Patent: Mar. 21, 2023

(54) REFINEMENT MODE PROCESSING IN VIDEO ENCODING AND DECODING

(71) Applicant: InterDigital VC Holdings, Inc., Wilmington, DE (US)

(72) Inventors: Edouard Francois, Bourg des Comptes (FR); Christophe Chevance, Brece (FR); Franck Hiron, Chateaubourg (FR)

(73) Assignee: InterDigital VC Holdings, Inc., Wilmington, DE (US)

( * ) Notice: Subject to any disclaimer, the term of this patent is extended or adjusted under 35 U.S.C. 154(b) by 0 days.

(21) Appl. No.: 17/252,772

(22) PCT Filed: Jun. 11, 2019

(86) PCT No.: PCT/US2019/036474
§ 371 (c)(1),
(2) Date: Dec. 16, 2020

(87) PCT Pub. No.: WO2019/245797
PCT Pub. Date: Dec. 26, 2019

(65) Prior Publication Data
US 2021/0258586 A1 Aug. 19, 2021

(30) Foreign Application Priority Data

Jun. 21, 2018 (EP) .................................. 18305785
Sep. 21, 2018 (EP) .................................. 18306226

(51) Int. Cl.
*H04N 9/00* (2006.01)
*H04N 19/186* (2014.01)
(Continued)

(52) U.S. Cl.
CPC ......... *H04N 19/186* (2014.11); *H04N 19/176* (2014.11); *H04N 19/80* (2014.11)

(58) Field of Classification Search
CPC ..... H04N 19/186; H04N 19/176; H04N 19/80
See application file for complete search history.

(56) References Cited

U.S. PATENT DOCUMENTS

| 9,621,917 B2 | 4/2017 | Kottke et al. |
| 9,749,651 B2 | 8/2017 | Merkle et al. |

(Continued)

FOREIGN PATENT DOCUMENTS

| WO | WO 2008048489 A2 | 4/2008 |
| WO | 2018070914 A1 | 4/2018 |
| WO | 2019147403 A1 | 8/2019 |

OTHER PUBLICATIONS

Bordes et al. "Description of SDR, HDR, and 360 degrees video coding technology proposal by Qualcomm and Technicolor—medium complexity version". JVET-J0022. Apr. 2018. (Year: 2018).*

(Continued)

*Primary Examiner* — Zhihan Zhou
(74) *Attorney, Agent, or Firm* — Condo Roccia Koptiw LLP

(57) ABSTRACT

Encoding or decoding a picture part of video information can include using a refinement mode per block where the refinement mode can be based on a refinement parameter. The refinement mode can include a cross-component refinement that can be a cross-component chroma refinement. The refinement mode can include enabling selection per block of a refinement parameter where the refinement parameter can include one or more chroma refinement parameters included in a chroma refinement table.

26 Claims, 26 Drawing Sheets

Example of Encoder Embodiment

(51) Int. Cl.
*H04N 19/176* (2014.01)
*H04N 19/80* (2014.01)

(56) References Cited

U.S. PATENT DOCUMENTS

| | | | | |
|---|---|---|---|---|
| 2012/0328013 | A1* | 12/2012 | Budagavi | H04N 19/186 375/240.12 |
| 2014/0092999 | A1* | 4/2014 | Dong | H04N 19/86 375/240.29 |
| 2014/0355675 | A1* | 12/2014 | He | H04N 19/82 375/240.12 |
| 2015/0350687 | A1* | 12/2015 | Zhai | H04N 19/186 375/240.25 |
| 2016/0088298 | A1 | 3/2016 | Zhang et al. | |
| 2016/0330445 | A1 | 11/2016 | Ugur et al. | |
| 2018/0359480 | A1* | 12/2018 | Xiu | H04N 19/85 |

OTHER PUBLICATIONS

Francois E. et al, "CE12-Related: In-Loop Chroma Refinement", Joint Video Experts Team (JVET) of ITU-T SG 16 WP 3 and ISO/IEC JTC 1/SC 29/WG 1111th Meeting:, Jul. 10-18, 2018; 3 pages.
Dong J et al: 11Non-RCE1: In-loop Chroma Enhancement for HEVC Range Extensions11 , 14. JCT-VC Meet! NG; Jul. 25, 2013-Feb. 8, 2013; Vienna; (Joint Collaborative Team On Video Coding of ISO/IEC JTC1/SC29/WG11 and ITU-T SG.16 ); URL: http://wftp3.itu.int/av-arch/jctvc-site/,, No. JCTVC-N0223-v2, Jul. 25, 2013 (Jul. 25, 2013), XP030114731, pp. 1,2.
Bross, Benjamin, "Versatile Video Coding (Draft 1)", JVET-J1001-V2, Editor, Joint Video Experts Team (JVET) of ITU-T SG 16 WP 3 and ISO/IEC JTC 1/SC 29/WG 11, 10th Meeting: San Diego, USA, Apr. 10-20, 2018, 43 pages.
ITU-T, "High Efficiency Video Coding", Recommendation ITU-T H.265, Series H: Audiovisual and Multimedia Systems Infrastructure of Audiovisual Services—Coding of Moving Video, Oct. 2014, 540 pages.
Minoo, et al., "Description of the Exploratory Test Model (ETM) for HDR/WCG Extension of HEVC", JCTVC-W0092r1 / m37732, Arris, Dolby, Interdigital, Qualcomm, Technicolor, Joint Collaborative Team on Video Coding (JCT-VC) of ITU-T SG WP 3 and ISO/IEC JTC 1/SC 29/WG 11, 23rd Meeting: San Diego, USA, Feb. 19-26, 2016, pp. 1-4.
Recommendation ITU-T H.264, "Series H: Audiovisual and Multimedia Systems Infrastructure of audiovisual services—Coding of moving video", Advanced video coding for generic audiovisual services, Feb. 2014, 790 pages.
Wang, et al., "Image quality assessment: From error visibility to structural similarity", IEEE Transactions On Image Processing, vol. 13, No. 4, Apr. 2004, pp. 1-13.
Rivaz, et al., "AV1 Bitstream & Decoding Process Specification", The Alliance for Open Media, AC1 Bitstream Specification V 1.0.0, AOMediaCodec/ac1-spec project, 667 pages, Jun. 25, 2018.

* cited by examiner

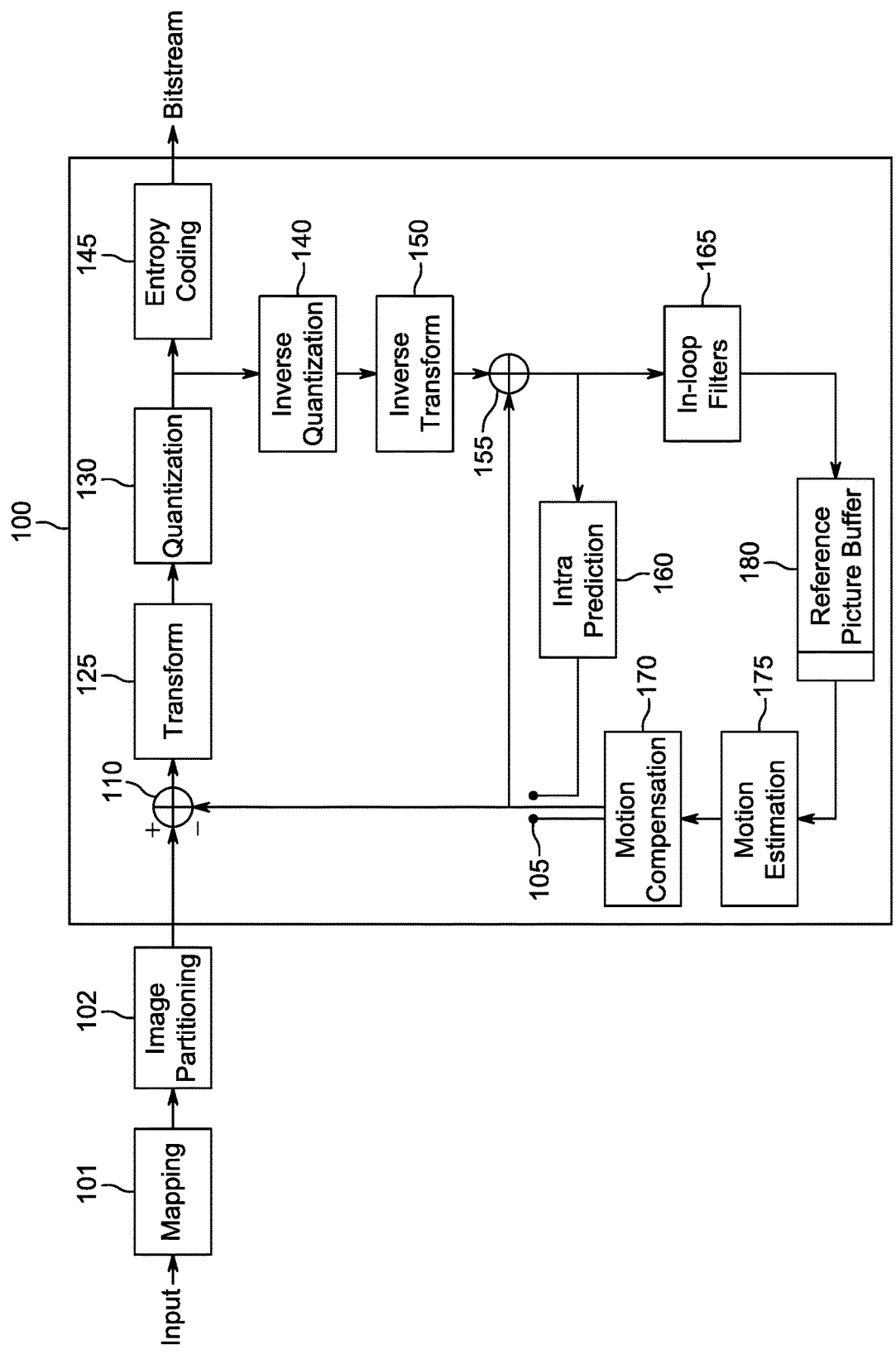
Figure 1. Example of Encoder Embodiment

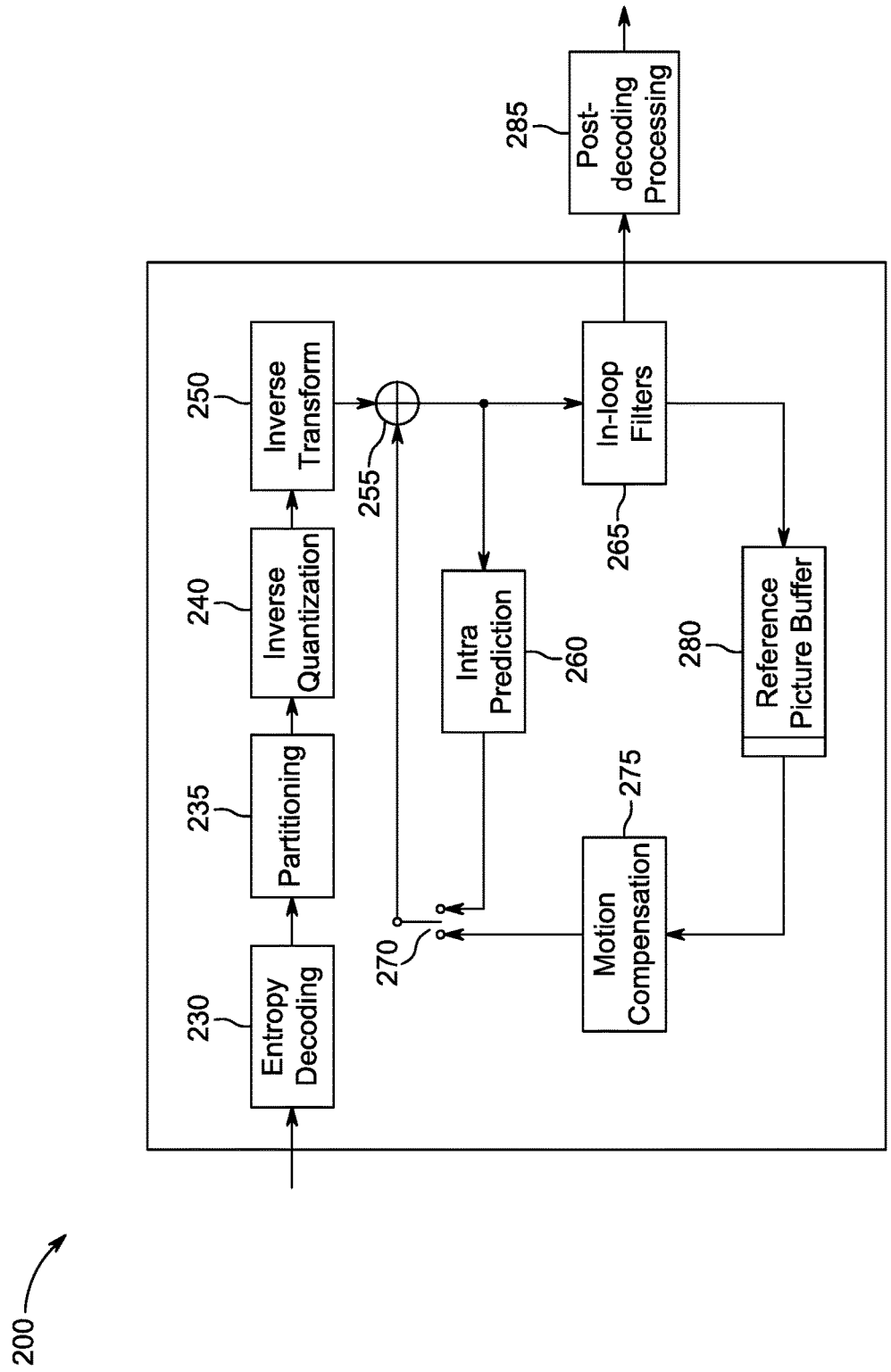
Figure 2: Example of Decoder Embodiment.

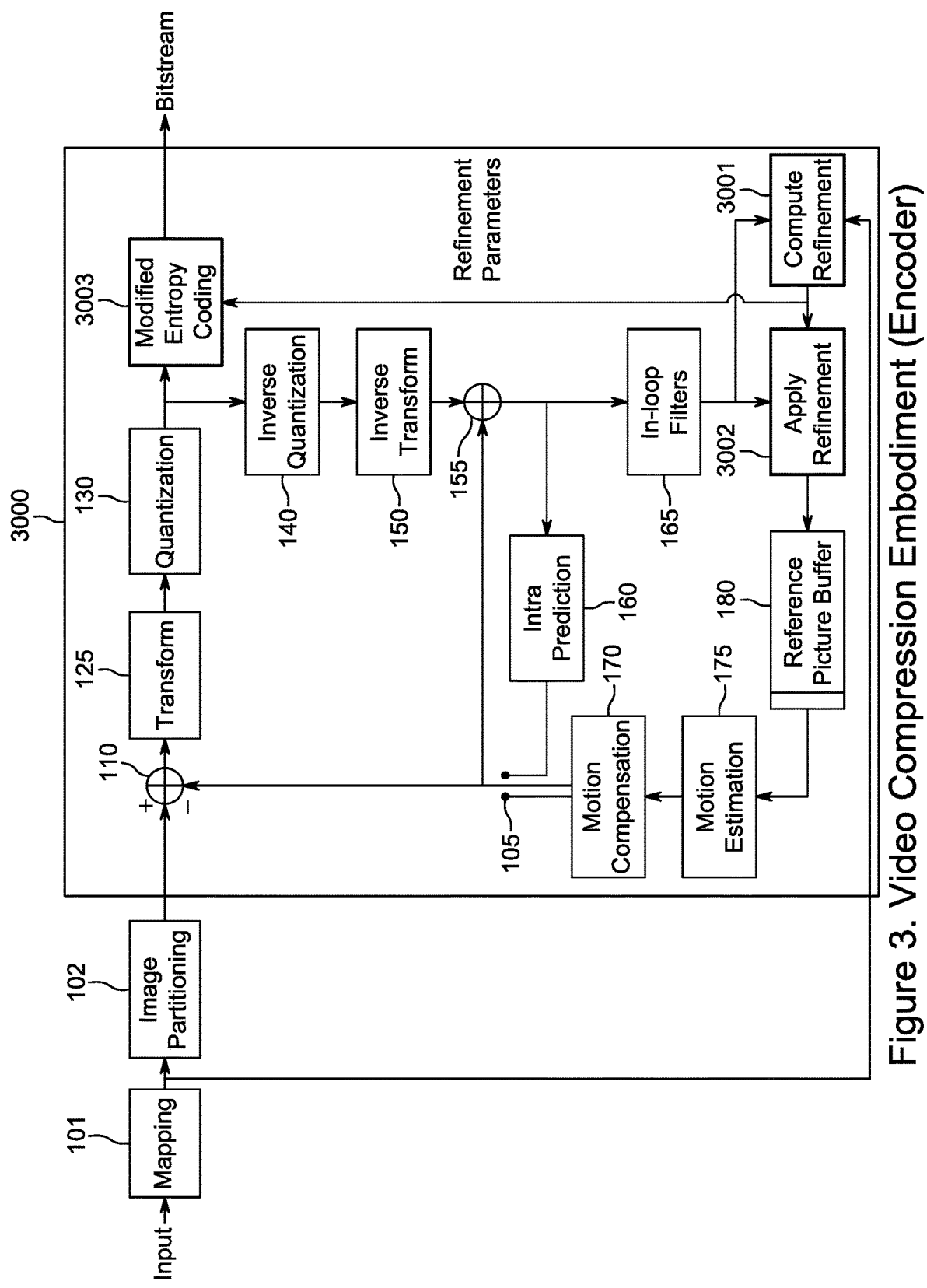
Figure 3. Video Compression Embodiment (Encoder)

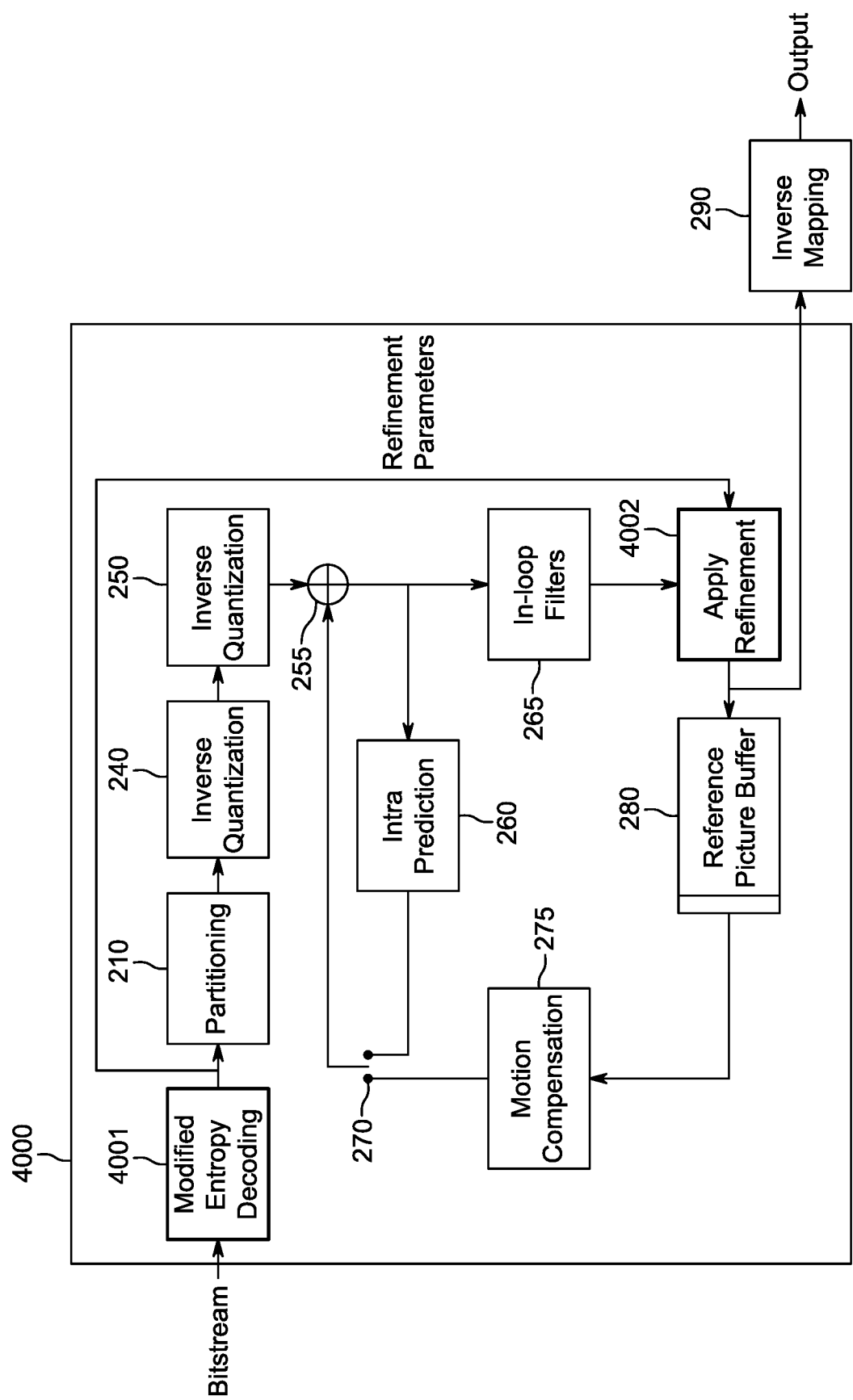
Figure 4. Video Compression Embodiment (Decoder)

| |
|---|
| refinement_parameters( ) { |
|   refinement_table_new_flag |
|   if( refinement_table_new_flag ) { |
|     refinement_table_flag_cb |
|     if( refinement_table_flag_cb ) { |
|       refinement_table_cb_size |
|       for( i = 0; i < refinement_table_cb_size; i++ ) { |
|         refinement_cb_idx[ i ] |
|         refinement_cb_value[ i ] |
|       } |
|     } |
|     refinement_table_flag_cr |
|     if( refinement_table_flag_cr ) { |
|       refinement_table_cr_size |
|       for( i = 0; i < refinement_table_cr_size; i++ ) { |
|         refinement_cr_idx[ i ] |
|         refinement_cr_value[ i ] |
|       } |
|     } |
|   } |
| } |

Figure 5. Syntax Embodiment

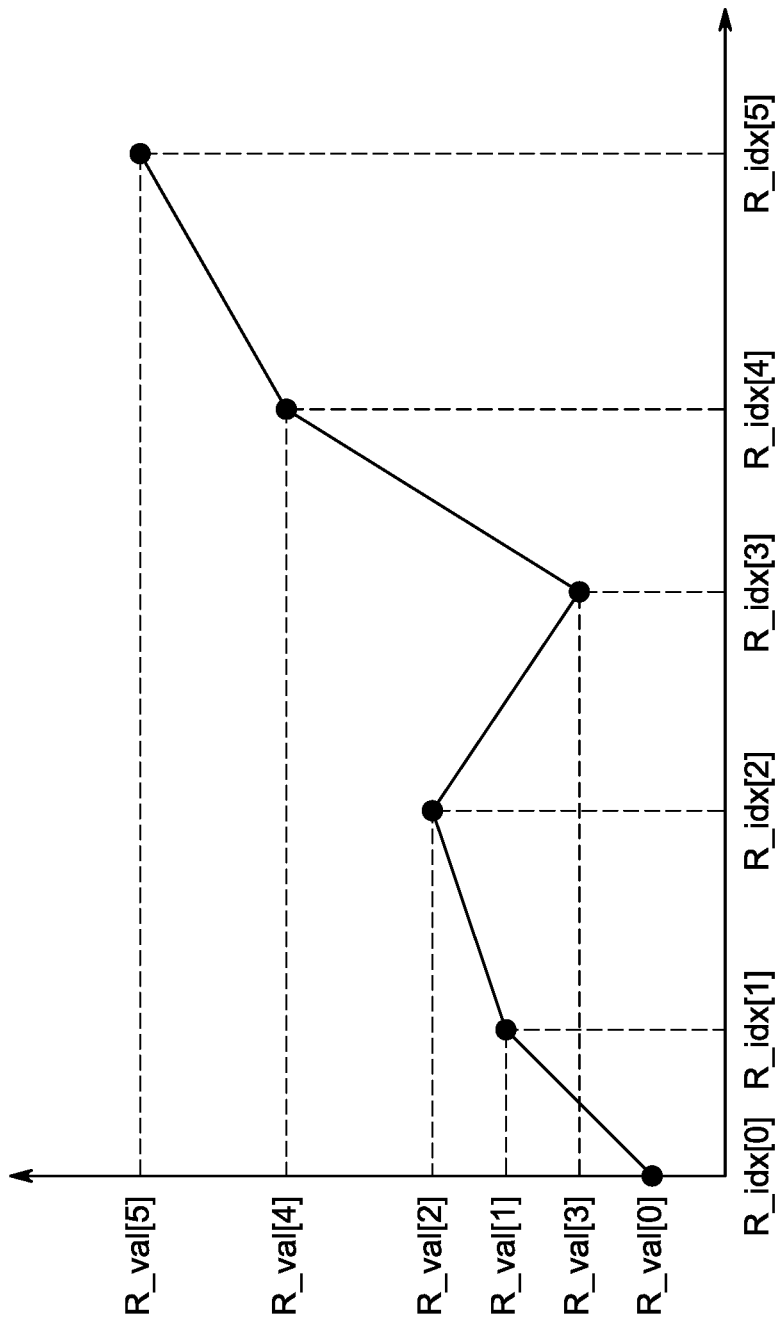
Figure 6. Illustration of a Refinement Table.

```
slice_header( ) {
  ...
  refinement_number_of_tables
  if( refinement_number_of_tables > 0 ) {
    for ( idx=0; idx < refinement_number_of_tables; idx++ ) {
      refinement_table_flag_cb[ idx ]
      if( refinement_table_flag_cb[ idx ] ) {
        refinement_table_cb_size[ idx ]
        for( i = 0; i < refinement_table_cb_size[ idx ]; i++ ) {
          refinement_cb_idx[ idx ] [ i ]
          refinement_cb_value[ idx ] [ i ]
        }
      }
      refinement_table_flag_cr[ idx ]
      if( refinement_table_flag_cr[ idx ] ) {
        refinement_table_cr_size[ idx ]
        for( i = 0; i < refinement_table_cr_size[ idx ]; i++ ) {
          refinement_cr_idx[ idx ] [ i ]
          refinement_cr_value[ idx ] [ i ]
        }
      }
    }
  }
  ...
}
```

Figure 7. Example of Slice Header Syntax using a Tables Pair Identifier.

| |
|---|
| block_refinement_parameters( ) { |
|    refinement_activation_flag |
|    if( refinement_activation_flag == 1 ) { |
|       tables_id |
|    } |
| } |
Figure 8: Example of block-level syntax using a tables pair identifier.
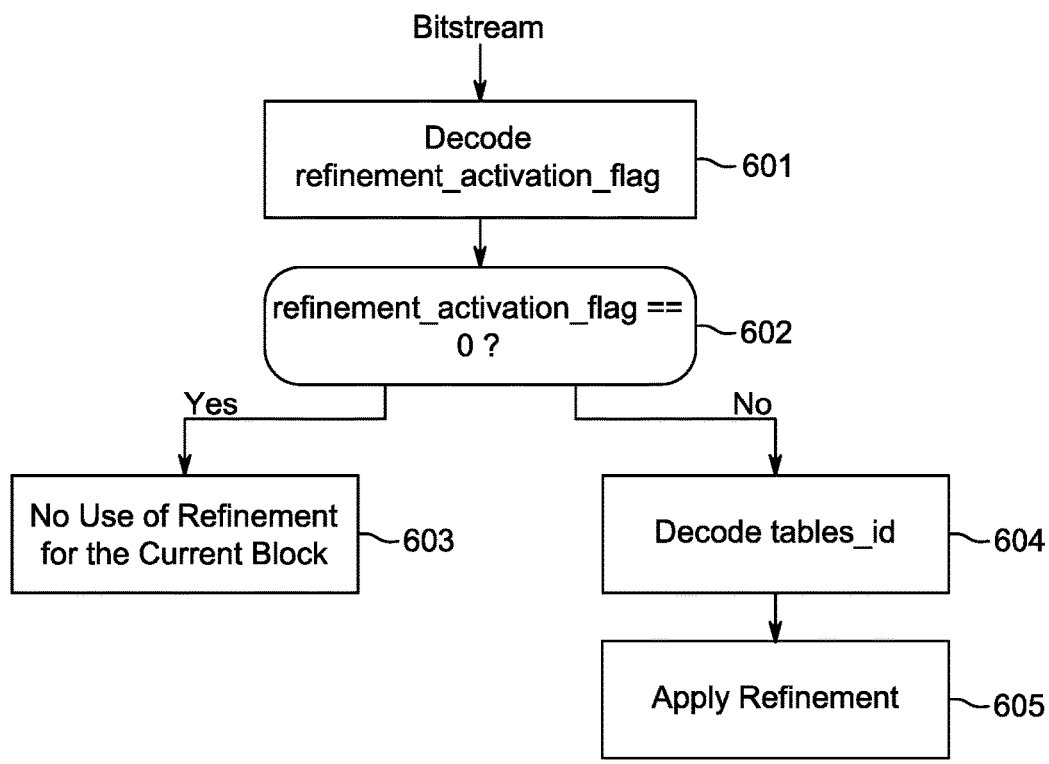
Figure 9. Block Diagram for Deriving the Refinement Information for the Current Block using a Tables Identifier.

| |
|---|
| block_refinement_parameters( ) { |
|    tables_from_left_flag |
|    if( tables_from_left_flag == 0 ) { |
|       tables_from_up_flag |
|       if( tables_from_up_flag == 0 ) { |
|          refinement_activation_flag |
|          if( refinement_activation_flag == 1 ) { |
|             refinement_parameters( ) |
|          } |
|       } |
|    } |
| } |

Figure 10. Example of Block-level Syntax for Referring to Neighboring Refinement Information.

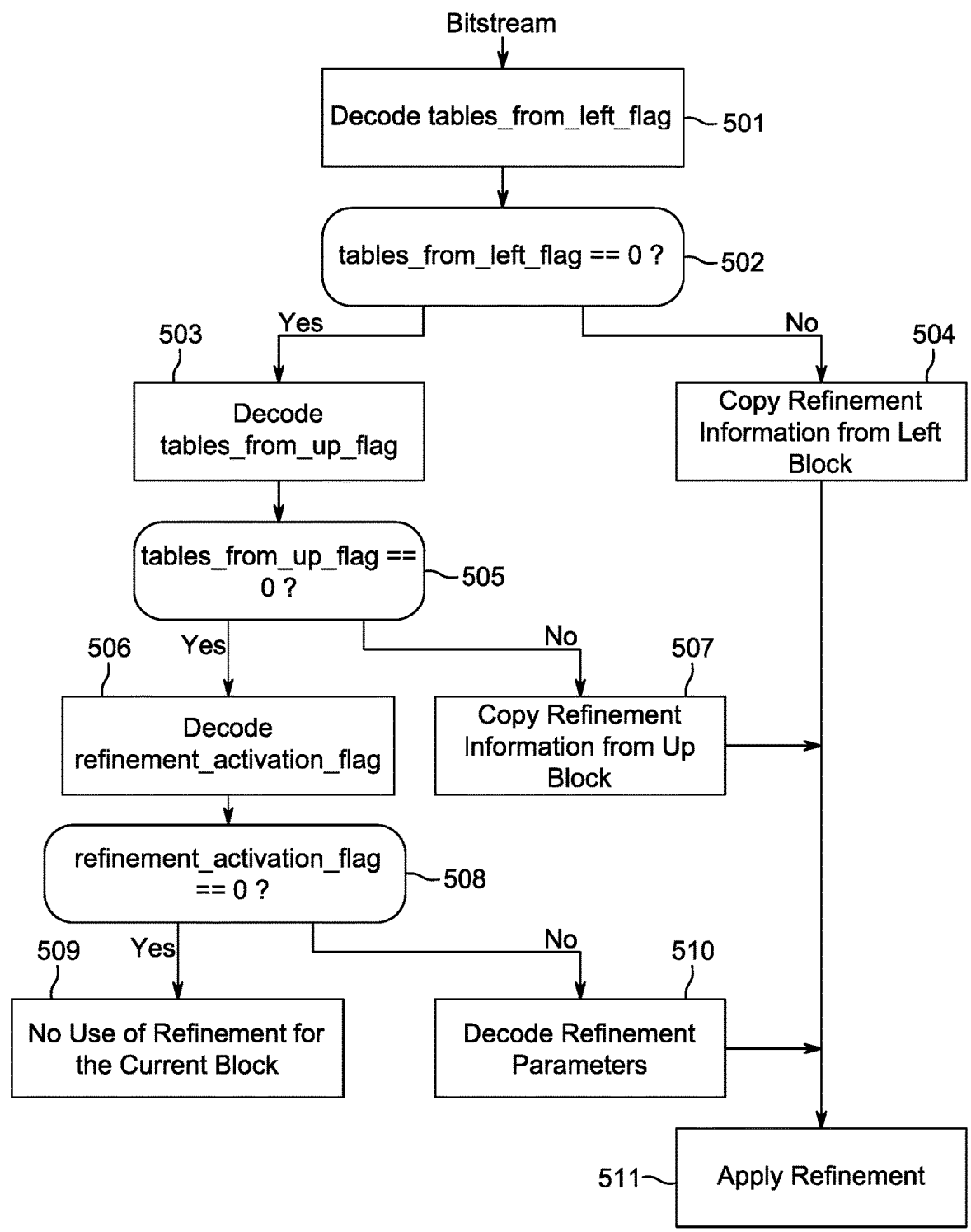
Figure 11. Block Diagram for Deriving the Refinement Information for the Current Block from Neighboring Refinement Information.

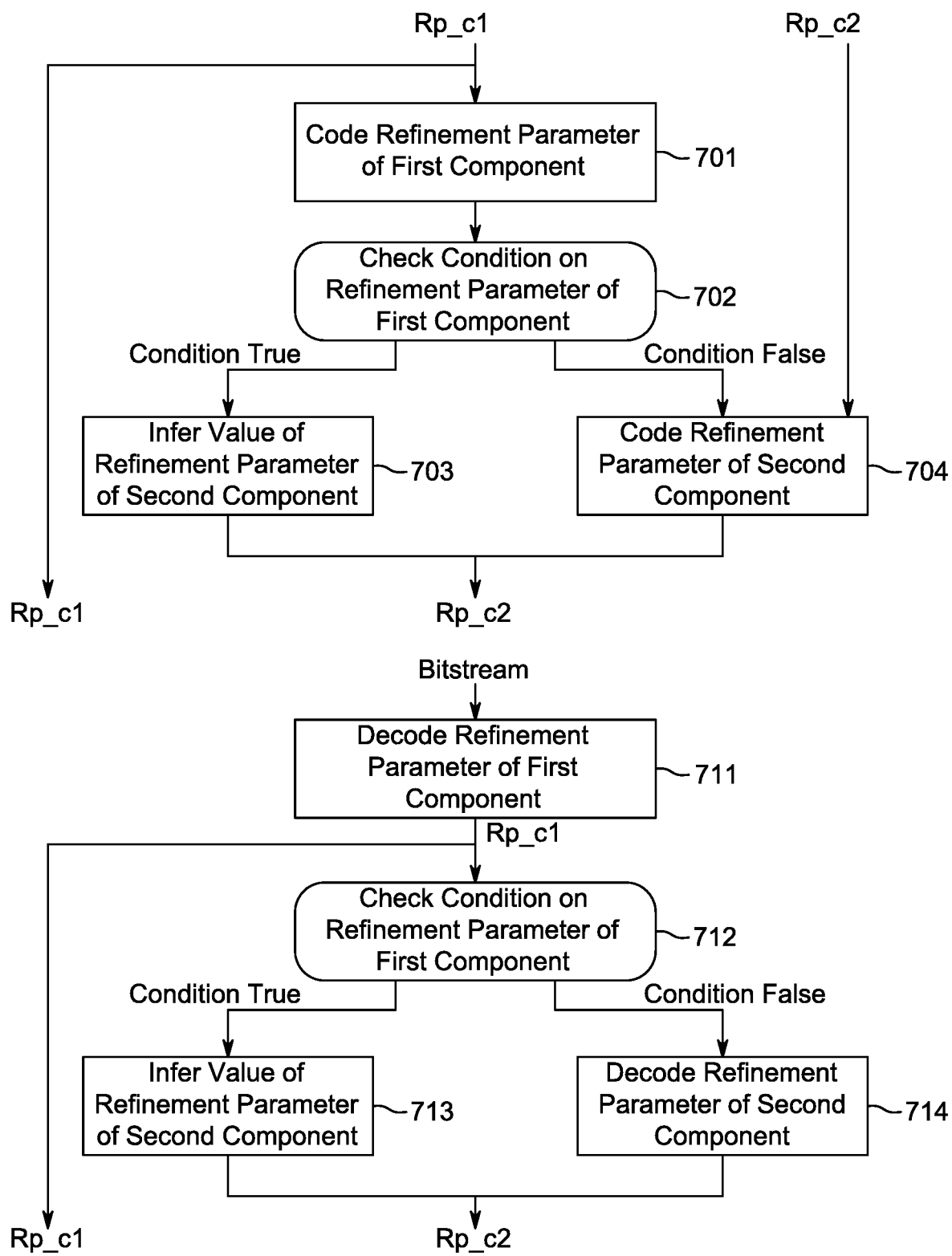
Figure 12. Modified Coding Process of Refinement Parameters (Top:Encoder, Bottom:Decoder).

```
refinement_parameters( ) {
    refinement_table_new_flag
    if( refinement_table_new_flag ) {
        refinement_table_size
        refinement_table_flag_cb
        if( refinement_table_flag_cb ) {
            for( i = 0; i < refinement_table_size; i++ ) {
                refinement_idx[ i ]
                refinement_cb_value[ i ]
            }
        }
        refinement_table_flag_cr
        if( refinement_table_flag_cr ) {
            for( i = 0; i < refinement_table_size; i++ ) {
                if (refinement_cb_value[ i ] != neutralValue)
                    refinement_cr_value[ i ]
            }
        }
    }
}
```

Figure 13. Modified Syntax for Avoiding Redundant Neutral Values.

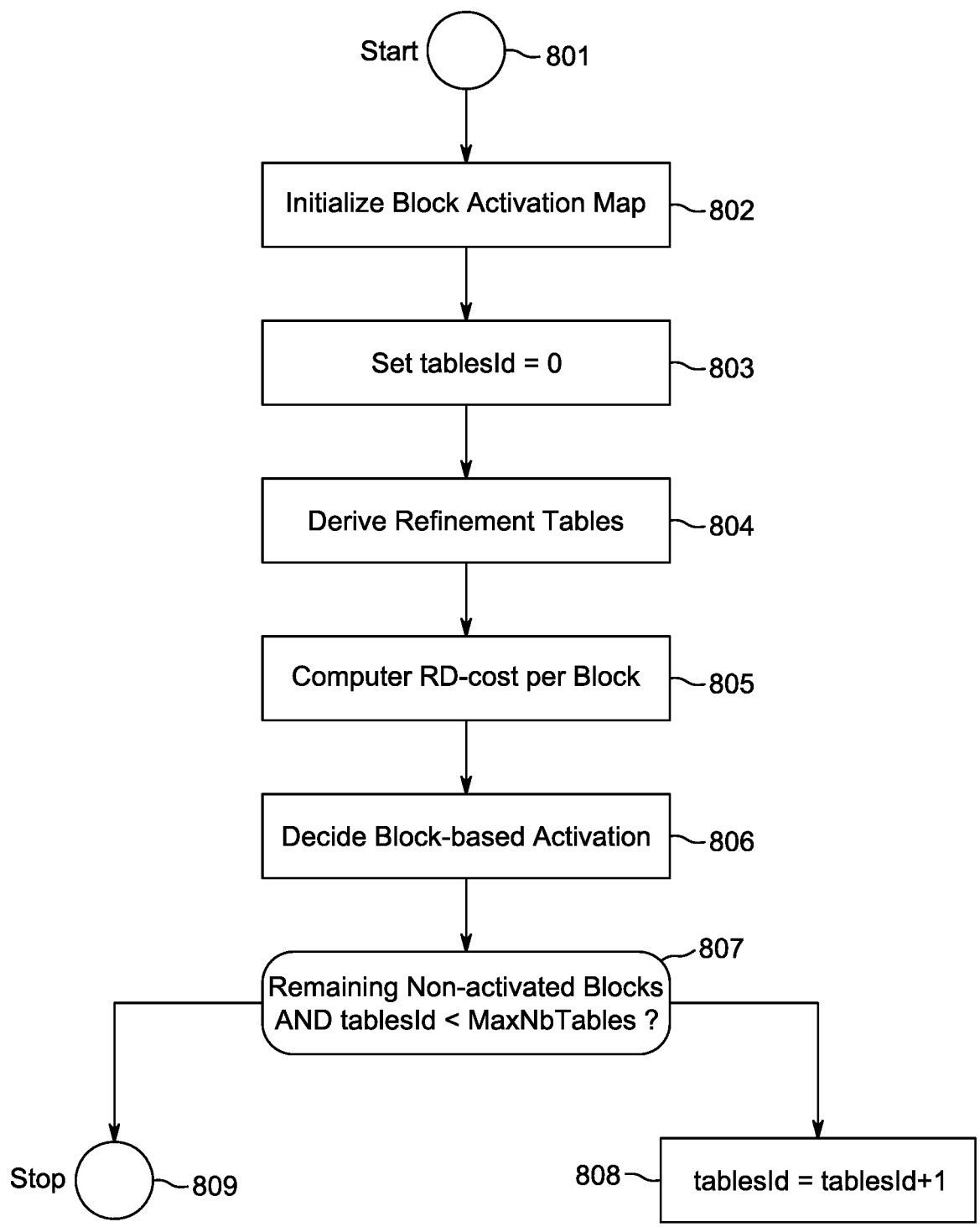
Figure 14. Block Diagram of a Method to Derive Activation Map and Refinement Tables.

REFINEMENT MODE PROCESSING IN VIDEO ENCODING AND DECODING

CROSS REFERENCE TO RELATED APPLICATIONS

This application is the national stage entry under 35 U.S.C. § 371 of International Application PCT/US2019/036474, filed Jun. 11, 2019, which was published in accordance with PCT Article 21(2) on Dec. 26, 2019, in English, and which claims the benefit of European Patent Application No. 18306226.4, filed Sep. 21, 2018 and European Patent Application No. 18305785.0, filed Jun. 21, 2018.

TECHNICAL FIELD

The present disclosure involves video encoding and decoding.

BACKGROUND

To achieve high compression efficiency, image and video coding schemes usually employ prediction and transform to leverage spatial and temporal redundancy in the video content. Generally, intra or inter prediction is used to exploit the intra or inter frame correlation, then the differences between the original picture block and the predicted picture block, often denoted as prediction errors or prediction residuals, are transformed, quantized and entropy coded. To reconstruct the video, the compressed data is decoded by inverse processes corresponding to the prediction, transform, quantization and entropy coding.

SUMMARY

In general, an example of at least one embodiment of a method comprises obtaining a cost (i) for encoding a picture part based on applying a refinement mode to a reconstructed signal per block, wherein the refinement mode is based on a refinement parameter, and (ii) for encoding the picture part using a mode other than the refinement mode; and encoding the picture part based on the cost.

In general, an example of at least one embodiment of an apparatus comprises one or more processors configured to obtain a cost for encoding a picture part based on applying a refinement mode to a reconstructed signal per block, wherein the refinement mode is based on a refinement parameter and for encoding the picture part without using the refinement mode, and encode the picture part based on the cost.

In general, an example of at least one embodiment of a method of decoding comprises obtaining an indication of a refinement mode being applied to a reconstructed signal per block during encoding of a picture part, wherein the refinement mode is based on a refinement parameter; and decoding the encoded picture part based on the indication.

In general, an example of at least one embodiment of an apparatus comprises one or more processors configured to obtain an indication of a refinement mode being applied to a reconstructed signal per block during encoding of an encoded picture part, wherein the refinement mode is based on a refinement parameter, and decode the encoded picture part based on the indication.

In general, an example of at least one embodiment comprises providing a signal formatted to include data representing an encoded picture part; and data providing an indication of a refinement mode being applied to a reconstructed signal per block based on a refinement parameter during encoding of the encoded picture part.

In general, an example of at least one embodiment comprises providing a bitstream formatted to include data representing an encoded picture part; and data providing an indication of a refinement mode being applied to a reconstructed signal per block based on a refinement parameter during encoding of the encoded picture part.

In general, an example of at least one embodiment comprises a computer program product or non-transitory computer readable storage medium having stored thereon computer readable instructions for causing one or more processors to carry out any of the methods described herein.

In general, one or more embodiments provides a computer readable storage medium, e.g., a non-volatile computer readable storage medium, having stored thereon instructions for encoding or decoding video data according to the methods or the apparatuses described herein and/or having stored thereon a bitstream generated according to methods or apparatus described herein. One or more of the present embodiments can also provide methods and apparatus for transmitting or receiving a bitstream generated according to methods or apparatus described herein.

In general, another example of at least one embodiment comprises a device including one or more processors configured to encode or decode a picture part according to methods or apparatus described herein, and including at least one of (i) an antenna configured to receive a signal, the signal including data representative of an image, (ii) a band limiter configured to limit the received signal to a band of frequencies that includes the data representative of the image, or (iii) a display configured to display the image.

BRIEF DESCRIPTION OF THE DRAWINGS

The present disclosure may be better understood by consideration of the detailed description below in conjunction with the accompanying figures, in which:

FIG. 1 provides a block diagram depicting an example of an embodiment of a video encoder.

FIG. 2 provides a block diagram depicting an example of an embodiment of a video decoder.

FIG. 3 provides a block diagram depicting another example of an embodiment of a video encoder.

FIG. 4 provides a block diagram depicting an example of another embodiment of a video decoder.

FIG. 5 provides a table depicting an example of an embodiment of signal syntax.

FIG. 6 provides a graph illustrating features of an embodiment of a refinement table.

FIG. 7 provides a table depicting another example of an embodiment of signal syntax.

FIG. 8 provides a table depicting an example of features of another embodiment of signal syntax.

FIG. 9 provides a flow diagram depicting an example of an embodiment of a process for deriving refinement information.

FIG. 10 provides a table depicting another example of an embodiment of signal syntax.

FIG. 11 provides a flow diagram depicting another example of an embodiment of a process for deriving refinement information.

FIG. 12 provides two flow diagrams depicting an example of an embodiment of a process for encoding and for decoding refinement parameters.

FIG. 13 provides a table depicting another example of an embodiment of signal syntax.

FIG. 14 provides a flow diagram depicting an example of an embodiment of a process for deriving information for use with one or more embodiments.

Figure 15:
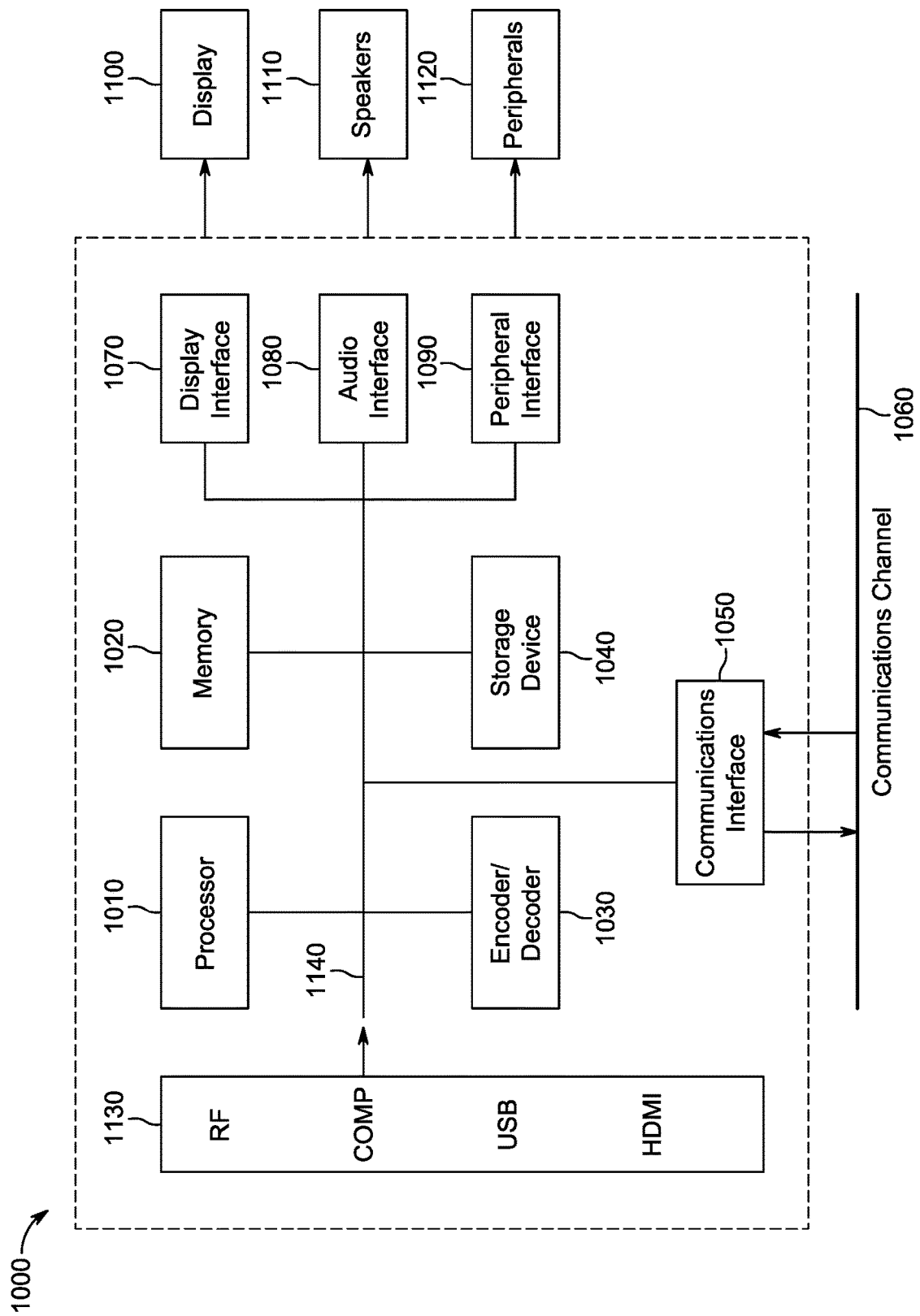
FIG. 15 provides a block diagram depicting an example of an embodiment of a system including video encoding and/or decoding.

It should be understood that the drawings are for purposes of illustrating examples of various aspects and embodiments and are not necessarily the only possible configurations. Throughout the various figures, like reference designators refer to the same or similar features.

DETAILED DESCRIPTION

Video compression and reconstruction processing may produce distortions. For example, distortions may be observed in the reconstructed video signal, especially in the case where the video signal is mapped before encoding, e.g. to better exploit sample codewords distribution of the video pictures. In general, at least one embodiment can provide for reducing distortions and/or improving compression efficiency using, for example, video signal refinement based on chroma components to provide flexibility and coding gains. At least one embodiment can involve a refinement step as an in-loop or out-of-loop filter for improving the reconstructed video signal after decoding. The refinement can be based, for example, on refinement tables coded in the bitstream or signal during encoding. Then, the decoder applies the signal correction (e.g., filtering) based on the refinement tables. Among various examples of possible modes, one example of a mode of at least one embodiment is a cross-component refinement of the chroma components. Another example of a mode of at least one embodiment is an intra-component refinement, e.g., applied to the luma component.

Applying certain processing, methods or techniques intended to provide refinement to an entire slice, or to a given entire area can result in a degradation of local parts of the slice or of the area for which the refinement applies, even if globally for the entire slice or area the refinement is beneficial. In general, at least one embodiment addresses this issue and also aims at improving the coding of data involved such as refinement tables. Refinements addressing an entire slice or area, can involve coding one table per component and applying this one table to all samples of the entire slice, or of the entire area.

In general, in at least one embodiment the tables are computed at the encoder side based on providing an improvement as indicated by a metric, e.g., by reducing a rate-distortion cost (typically a weighted sum of the distortion and of the coding cost) over the entire considered picture or area. The distortion, for example, can be the mean square error between the refined reconstructed signal and the original one. The resulting tables are then coded in the bitstream or signal. If the rate-distortion cost over the considered slice or area is globally decreased, this also means that there may be some parts in the considered slice or area where the rate-distortion cost is increased. In general, at least one example of an embodiment can include a refinement mode comprising a cross-component chroma refinement. Another example of an embodiment can include an intra-component refinement, e.g., applied to a luma component.

As used herein, a refinement of data can refer to a change, adjustment, modification, revision, or adaptation of processing that can produce an improvement, e.g., an improvement such as increased efficiency of coding and/or decoding information such as video data and/or other improvements such as reducing a cost such as a rate distortion cost as described herein. For ease of explanation, one or more embodiments described herein may refer to a "cost" as being a "rate distortion cost" that may be used to evaluate, determine or obtain an effect, impact or improvement associated with use of a refinement mode. For example, a cost associated with and without use of a refinement mode may be evaluated (e.g., compared) to determine whether or not to use a refinement mode as described herein, e.g., based on an improvement such as improved compression efficiency and/or reduced distortion indicated by a change in the cost. Although one type of cost can comprise a rate distortion cost, references to rate distortion cost herein are not limiting as other types of costs and/or other approaches to evaluating the effect of a refinement mode are envisioned.

Also, in the description herein, the word "reconstructed" and "decoded" can be used interchangeably. Usually but not necessarily "reconstructed" is used on the encoder side while "decoded" is used on the decoder side. It should be noted that the term "decoded" or "reconstructed" may mean that a bitstream or signal is partially "decoded" or "reconstructed," for example, the signals obtained after deblocking filtering but before SAO filtering, and the reconstructed samples may be different from the final decoded output that is used for display. Also, the terms "image," "picture," and "frame" may be used interchangeably.

In general, at least one embodiment can involve enabling activation of refinement per block, and in possibly enabling selection per block of the refinement parameters to apply to the block among a set of possible refinement parameters previously coded in the stream. The term "block" can be replaced in variants by "Coding Unit" (CU), "Coding Tree Unit" (CTU).

In general, one or more embodiments relate to an encoder and a decoder and one or more embodiments can relate to a decoder specification and semantics.

FIG. 1 illustrates an example of an embodiment of an encoder 100. Variations of this encoder 100 are contemplated, but the encoder 100 is described below for purposes of clarity without describing all expected variations.

Before being encoded, the video sequence can go through pre-encoding processing (101), for example, applying a color transform to the input color picture (e.g., conversion from RGB 4:4:4 to YCbCr 4:2:0), or performing a remapping of the input picture components in order to get a signal distribution more resilient to compression (for instance using a histogram equalization of one of the color components). Metadata can be associated with the pre-processing, and attached to the bitstream or signal.

In the encoder 100, a picture is encoded by the encoder elements as described below. The picture to be encoded is partitioned (102) and processed in units of, for example, CUs. Each unit is encoded using, for example, either an intra or inter mode. When a unit is encoded in an intra mode, it performs intra prediction (160). In an inter mode, motion estimation (175) and compensation (170) are performed. The encoder decides (105) which one of the intra mode or inter mode to use for encoding the unit, and indicates the intra/inter decision by, for example, a prediction mode flag. Prediction residuals are calculated, for example, by subtracting (110) the predicted block from the original image block.

The prediction residuals are then transformed (125) and quantized (130). The quantized transform coefficients, as well as motion vectors and other syntax elements, are entropy coded (145) to output a bitstream or signal. The encoder can skip the transform and apply quantization directly to the non-transformed residual signal. The encoder can bypass both transform and quantization, i.e., the residual is coded directly without the application of the transform or quantization processes.

The encoder decodes an encoded block to provide a reference for further predictions. The quantized transform coefficients are de-quantized (140) and inverse transformed (150) to decode prediction residuals. Combining (155) the decoded prediction residuals and the predicted block, an image block is reconstructed. In-loop filters (165) are applied to the reconstructed picture to perform, for example, deblocking/SAO (Sample Adaptive Offset) filtering to reduce encoding artifacts. The filtered image is stored at a reference picture buffer (180).

FIG. 2 illustrates a block diagram of an example of an embodiment of a video decoder 200. In the decoder 200, a bitstream or signal is decoded by the decoder elements as described below. Video decoder 200 generally performs a decoding pass reciprocal to the encoding pass as described in FIG. 1. The encoder 100 also generally performs video decoding as part of encoding video data.

In particular, the input of the decoder includes a video bitstream or signal, which can be generated by video encoder 100. The bitstream or signal is first entropy decoded (230) to obtain transform coefficients, motion vectors, and other coded information. The picture partition information indicates how the picture is partitioned. The decoder can therefore divide (235) the picture according to the decoded picture partitioning information. The transform coefficients are de-quantized (240) and inverse transformed (250) to decode the prediction residuals. Combining (255) the decoded prediction residuals and the predicted block, an image block is reconstructed. The predicted block can be obtained (270) from intra prediction (260) or motion-compensated prediction (i.e., inter prediction) (275). In-loop filters (265) are applied to the reconstructed image. The filtered image is stored at a reference picture buffer (280).

The decoded picture can further go through post-decoding processing (285), for example, an inverse color transform (e.g. conversion from YCbCr 4:2:0 to RGB 4:4:4) or an inverse remapping performing the inverse of the remapping process performed in the pre-encoding processing (101). The post-decoding processing can use metadata derived in the pre-encoding processing and signaled in the bitstream or signal.

In general, in at least one embodiment one or more features as described herein can affect portions or sections or modules of a coder/decoder (codec) such as the in-loop filters (165 and 265) and the entropy coding (145) and decoding (230), according to the various examples of features described herein.

FIG. 3 illustrates a variant 3000 of the video encoder 100 of FIG. 1. The modules of FIG. 3 identical to the modules of FIG. 1 are labelled with the same numerical references and are not further described. In FIG. 3, the illustrated embodiment includes the refinement process being in-loop. A step of computing refinement parameters (step 3001) is done after the in-loop filtering step (165). The refinement parameters computing step takes as input the input video, and the reconstructed video coming from the in-loop filtering step. It computes refinement parameters that are coded into the bitstream or signal by a modified entropy coder (3003). The refinement parameters are also used to apply a refinement step (3002) to the reconstructed video coming from the in-loop filters.

FIG. 4 illustrates a variant 102 of the video encoder 100 of FIG. 2. The modules of FIG. 4 identical to the modules of FIG. 2 are labelled with the same numerical references and are not further described. In FIG. 4, the bitstream or signal is decoded in step 4001 by an entropy decoder. The entropy decoder produces the reconstructed video, and in addition, the decoded refinement parameters. The refinement parameters are used in step 4002 to apply the refinement of the reconstructed video, to produce the output video.

As used herein, the following notations represent or correspond to:
  B is the bit depth of the signal (for instance, 10 bits)
  MaxVal is the max value of the signal, computed as $(2^B-1)$
  $Sin\_Y(p)$, $Sin\_cb(p)$, $Sin\_cr(p)$ correspond to the Y, cb and cr original (input) signal, at relative location p in the picture
  $Sout\_cb(p)$, $Sout\_cr(p)$ correspond to the cb and cr (input) signal resulting from the refinement, at relative location p in the picture
  $Srec\_Y(p)$ corresponds to the reconstructed luma signal, at relative location p in the picture. It corresponds to the signal coming from the in-loop filters
  $Srec\_cb(p)$, $Srec\_cr(p)$ correspond to the reconstructed chroma signal, to be refined, at relative location p in the picture. It corresponds to the signal coming from the in-loop filters neutralVal corresponds to a pre-defined value; when the refinement value is equal to neutralVal, the refinement does not modify the signal; a typical value for neutralVal is 64

Rcb, Rcr correspond to the chroma refinement parameters

Rcb, Rcr can be typically defined as pivot points of piecewise linear (PWL) models. For instance, Rcb={(Rcb idx[pt], Rcb_val[pt]), for pt=0 to Ncb−1}, Ncb being the number of pivot points.

From the chroma refinement parameters Rcb, Rcr, look-up-tables LutRcb, LutRcr are derived. For instance, LutRcb can be built by linear interpolation between each couple of points of Rcb as follows.

For pt=0 to Ncb−2
For idx=Rcb idx[pt] to (Rcb idx[pt+1]−1)

$$LutRcb[idx]=Rcb\_val[pt]+(Rcb\_val[pt+1]-Rcb\_val[pt])*(idx-Rcb\_idx[pt])/(Rcb\_idx[pt+1]-Rcb\_idx[pt])$$

An embodiment of a cross-component chroma refinement works as follows (illustrated here for component cb):

Sout_cb(p)=offset+LutRcb[Srec_Y(p)]/neutralVal* (Srec_cb(p)−offset) where offset is a in general set to (MaxVal/2), and p corresponds to the same relative position in the picture.

Or as follows:

Sout_cb(p)=(LutRcb[Srec_Y(p)]−neutralVal)+Srec_cb(p)

In another example of an embodiment, the refinement can be applied as an intra-component refinement of the luma component, that works as follows:

Sout_Y(p)=(LutRy[Srec_Y(p)]/neutralVal)*Srec_Y(p)

Or as follows:

Sout_Y(p)=LutRy[SrecY(p)]+Srec_Y(p)

An embodiment can include providing a bitstream or signal having one or more syntax features such as those illustrated in the example of FIG. 5. An aspect can include only the chroma components being refined. For example, when refinement_table_flag_cb is true, for all pt from 0 to (refinement_table_cb_size−1), the cb refinement table values (Rcb_idx[pt], Rcb_val[pt]) are computed as follows:

Rcb_idx[pt] is set equal to (Rcb_idx[pt−1]+refinement_cb_idx[pt])

Rcb_val[pt] is set equal to (neutralVal+refinement_cb_value[pt])

A similar process applies for cr component.

An example of a refinement table is illustrated in FIG. 6 where refinement_table_cb_size=6 (pt=0 to 5). For notation simplification, "Rcb" was replaced by "R" in FIG. 6.

In an embodiment, when a block-based cross-component chroma refinement is activated, K pairs of cb,cr refinement tables (Rcb$_k$, Rcr$_k$), for k=1 to K, are enabled. When K is equal to 0, no refinement applies in the slice. One or several block-based indicators are coded per block to indicate which one of these tables pairs is used, or if no refinement is activated or not for the block.

In a non-limiting example of an embodiment, only one pair of tables is used (K=1).

In another example of an embodiment, in the slice header, the set of refinement tables is first coded. An example of syntax for decoding the pairs of cb,cr refinement tables is depicted in FIG. 7. In FIG. 7, an example of slice header syntax using a tables pair identifier is illustrated wherein:

refinement_number_of_tables indicates the number of chroma refinement tables pairs coded in the stream. This number shall be greater than or equal to 0. When equal to 0, this means that no chroma refinement is applied for the current slice. If refinement_number_of_tables is greater than 0, at least refinement_table_flag_cb[idx] or refinement_table_flag_cr[idx], for any value of idx between 0 and (refinement_number_of_tables−1), shall be equal to 1.

Note: refinement_number_of_tables corresponds to the parameter K discussed above.

refinement_table_flag_cb[idx] indicates if a refinement table is coded for the cb component of the refinement tables pair of identifier value idx. If refinement_table_flag_cb[idx] is equal to 0, refinement_table_flag_cr[idx] shall be equal to 1.

refinement_table_cb_size[idx] indicates the size of the cb refinement table of the refinement tables pair of identifier value idx.

refinement_cb_idx[idx] [i] indicates the index (first coordinate) of the $i^{th}$ element of the cb refinement table of the refinement tables pair of identifier value idx.

refinement_cb_value[idx] [i] indicates the value (second coordinate) of the $i^{th}$ element of the cb refinement table of the refinement tables pair of identifier value idx.

refinement_table_flag_cr[idx] indicates if a refinement table is coded for the cr component of the refinement tables pair of identifier value idx. If refinement_table_flag_cr[idx] is equal to 0, refinement_table_flag_cb[idx] shall be equal to 1.

refinement_table_cr_size[idx] indicates the size of the cr refinement table of the refinement tables pair of identifier value idx.

refinement_cr_idx[idx] [i] indicates the index (first coordinate) of the $i^{th}$ element of the cr refinement table of the refinement tables pair of identifier value idx.

refinement_cr_value[idx] [i] indicates the value (second coordinate) of the $i^{th}$ element of the cr refinement table of the refinement tables pair of identifier value idx.

At the block (or CU, or CTU) level, a block-based identifier tables_id is signaled, corresponding to the identifier of the pairs of cb,cr refinement tables to be applied to the current block. An example of syntax for decoding the block refinement information is depicted in FIG. 8 which shows an example of block-level syntax using a tables pair identifier. In FIG. 8:

The syntax element refinement_activation_flag indicates if the current block uses refinement or not.

If the current block is using refinement (refinement_activation_flag is equal to 1), the syntax element tables_id is decoded. And the current block is refined using the refinement tables corresponding to the identifier tables_id:

for i=0 to (refinement_table_cb_size[tables_id]−1)
refinement_cb_idx[tables_id] [i]
refinement_cb_value[tables_id] [i]
for i=0 to (refinement_table_cr_size[tables_id]−1)
refinement_cr_idx[tables_id] [i]
refinement_cr_value[tables_id] [i]

A corresponding block diagram illustrating an embodiment for deriving the refinement information for the current block is shown in FIG. 9. In FIG. 9, at 601, the syntax element refinement_activation_flag is decoded. At 602, refinement_activation_flag is checked to be equal to 0. If refinement_activation_flag is equal to 0, no refinement applies (603). If refinement_activation_flag is not equal to 0, tables_id is decoded at 604. At 605, the refinement is applied using the tables pair indicated by the identifier tables_id.

In an embodiment, the syntax element refinement_activation_flag is not coded but a specific value of tables_id indicates that the block is not refined. For instance, tables_id equal to 0 indicates that the current block does not use refinement. The test "refinement_activation_flag=0 ?" is replaced by "tables_id=0 ?".

In another embodiment, an aspect involves coding relatively to neighboring refinement information. For example, the block-based indicator is made of syntax elements indicating if the refinement information for the current block is copied from neighboring blocks. The refinement information is made of at least a parameter indicating if the block used refinement or not (named here refinedBlock, also corresponding to a syntax element named refinement_activation_flag), if refinedBlock indicates that the block is refined, the refinement tables used to refine the samples of the block.

An example of syntax for decoding the block refinement information is depicted in FIG. 10 wherein:

tables_from_left_flag indicates if the refinement information is copied from the left block of the current block.

tables_from_up_flag indicates if the refinement information is copied from the upper block of the current block.

refinement_activation_flag indicates if the refinement is activated for the current block.

The corresponding block diagram for deriving the refinement information for the current block is provided in FIG. 11. In FIG. 11, at (501) the syntax element tables_from_left_flag is decoded. At 502, tables_from_left_flag is checked to be equal to 0. If tables_from_left_flag is not equal to 0, the refinement information for the current block are copied from the left block of the current block (504). Otherwise, the syntax element tables_from_up_flag is decoded at 503. At 505, tables_from_up_flag is checked to be equal to 0. If tables_from_up_flag is not equal to 0, the refinement information for the current blocks are copied from the up block of the current block (507). Otherwise, the syntax element refinement_activation_flag is decoded at 506. refinedBlock for the current block is set to refinement_activation_flag. At 508, refinement_activation_flag is checked to be equal to 0. If refinement_activation_flag is equal to 1, refinement tables are decoded (510). Otherwise, no specific process applies (510). At 511, the refinement is applied. In this step, if refinedBlock is equal to 0, the block is not processed by the refinement process. If refinedBlock is equal to 1, the block is refined using the refinement tables derived for the current block.

In an embodiment, refinement_activation_flag is not explicitly coded or decoded, but is implicitly inferred contextually. For instance, the context is related to the SAO loop filtering process. In this embodiment, refinement_activation_flag is deduced from the SAO parameters. In one embodiment, if SAO is disabled for the block, refinement_activation_flag is set equal to 0. If SAO is enabled for the block, refinement_activation_flag is set equal to 1. In another embodiment, if SAO Band Offset is disabled for the block, refinement_activation_flag is set equal to 0. If SAO Band Offset is enabled for the block, refinement_activation_flag is set equal to 1. A similar rule can apply for other SAO types, such as Edge Offset.

In an embodiment, the Refinement process is jointly applied with another Loop Filter process, such as the SAO.

In general, an embodiment can include reducing tables coding cost by avoiding redundant neutral values. In an embodiment, it is considered that the chroma refinement tables have the same size (Ncb=Ncr=N), and share the same indexes: Rcb_idx[pt]=Rcr_idx[pt] for pt=0 to (N−1)

It is observed that in most cases, when the refinement parameter for one component (e.g. cb) is equal to the neutral value neutralVal, the corresponding refinement parameter for the other chroma component is frequently close to the neutral value.

This is illustrated in the example below obtained from the processing of the first picture of the SDR content BasketballDrive_1920×1080, coded with a QP of 37 using the VTM codec. neutralValue is equal to 64, and the cases where the refinement value is close to 64 is indicated in bold font.

cb 64, 32, 44, 63, 65, 65, 64, 64, 65, 64, 63, 56, 54, 54, 56, 37, 64, cr 64, 35, 60, 64, 65, 64, 64, 64, 65, 64, 61, 57, 51, 45, 49, 46, 64,

Therefore, in an embodiment the cost of the refinement parameters can be reduced by conditioning the coding of the refinement parameters of the second chroma component based on the corresponding refinement parameters value of the refinement parameters of the first chroma component. This is shown in FIG. 12 that includes both an upper block diagram corresponding to the encoder side and a lower block diagram corresponding to the decoder side.

At the encoder, the input values are a refinement parameter of the first chroma component (e.g. the cb component), Rp_c1, and the corresponding refinement parameter of the second chroma component Rp_c2 (that is, specified for the same relative index in the refinement parameter table). A first step performs the encoding of the refinement parameter of the first chroma component Rp_c1 (step 701). A second step checks a condition related to the value of Rp_c1 (step 702). If the condition is false, the value of the corresponding refinement parameter of the second chroma component Rp_c2 is encoded (step 704). If the condition is true, the value of Rp_c2 is inferred (step 703).

At the decoder, a first step performs the decoding of the refinement parameter of the first chroma component Rp_c1 (step 711). A second step involves checking a condition related to the value of Rp_c1 (step 712). If the condition is false, the value of the corresponding refinement parameter of the second chroma component Rp_c2 is decoded (step 714). If the condition is true, the value of Rp_c2 is inferred (step 713).

In an embodiment, the tested condition can include checking if the value of the refinement parameter of the first chroma component is equal to neutralValue:

Rp_c1==neutralValue ?

In another embodiment, the tested condition can include checking if the value of the refinement parameter of the first chroma component is larger or equal to (neutralValue−thresh1), or lower or equal to (neutralValue−thresh2), where thresh1 and thresh2 are predefined values (typically equal to 1):

Rp_c1>=(neutralValue-thresh1) AND Rp_c1<=(neutralValue+thresh2) ?

In an embodiment, the inferred value of Rp_c2 is neutralValue.

In an embodiment, the inferred value of Rp_c2 is Rp_c1.

In an embodiment, the inferred value of Rp_c2 is (neutralValue−Rp_c1).

An example of modified syntax is shown in FIG. 13, with the condition

Rp_c1 (refinement_cb_value[i] in the table)==neutralValue ?

Rp_c2 (refinement_cr_value[i] in the table) is inferred to neutralValue when this condition is true. Otherwise this element is explicitly signaled.

In general, an embodiment can include control of the size of refinement tables. For example, in an embodiment, in order to reduce the coding cost of the refinement tables, at least one of the following can be included:
  the tables size for cb and cr is the same and is fixed and defined by default, named N here.
  the indexes of the tables Rcb_idx[pt] and Rcr_idx[pt] correspond to equi-distant points.
  a limited predefined number Nref of elements per refinement table is coded. In this case, an indication of the first table point pt_init for which the tables elements are coded is given. The coded refinement values are therefore
    Rcb_idx[pt_init] to Rcb_idx[pt_init+Nref−1]
    Rcr_idx[pt_init] to Rcr_idx[pt_init+Nref−1]
  The other (not coded) values are set to the neutral value (neutralVal)
    Rcr_idx[pt]=neutralVal and Rcb_idx[pt]=neutralVal for pt=0 to (pt_init−1) and from (pt_init+Nref) to (N−1) In an embodiment, the number of values per refinement table Nref is equal to 4.

In an embodiment, an encoder can determine a block-based refinement activation and derive one or more refinement tables in accordance with one or more embodiments described herein based, e.g., on actions listed below and illustrated in the corresponding block diagram shown in FIG. 14. In an implementation, the listed actions can occur iteratively.
1. A map blkTablesId[blkId], for blkId=0 to (Nblk−1), Nblk being the number of blocks of the slice, is initialized to −1 (step 802).
2. A parameter for tables identifier, tablesId, is initialized to 0 (step 803).
3. Refinement tables for the identifier tablesId are derived from samples in blocks blkId for which blkTablesId[blkId]=−1 (step 804)
   a. The results are cb and cr tables:
      i. (refinement_cb_idx[tablesId] [i], refinement_cb_value[tablesId][i]), i being from 0 to (refinement_table_cb_size[tablesId]−1) and (refinement_cr_idx[tablesId] [i], refinement_cr_value[tablesId][i]), i being from 0 to (refinement_table_cr_size[tablesId]−1)
   b. See below for an embodiment for performing the described computation.
4. For each block blkId for which blkTablesId[blkId]=−1, the chroma rate-distortion cost is computed, without refinement (RD_without[blkId]), and with refinement using tables computed in step 3 (RD_with[blkId]) (step 805).
   a. chroma rate-distortion cost is computed as follows:

distortion(*cb*)+distortion(*cr*)+*L*\*cost(refinement_table_*cb*)+*L*\*cost(refinement_table_*cr*)+*L*\*cost(activation map)

where L is the well-known "lambda" parameter in the rate-distortion cost derivation.
5. For all blocks blkId for which blkTablesId[blkId]=−1, the block-based refinement activation is updated as follows (step 806):
   a. If (RD_with[blkId]<RD_without[blkId]) blkTablesId[blkId]=tablesId
6. If there are still blocks blkId such as blkTablesId[blkId]=−1, and if tablesId<MaxNbTables (step 807),
   a. increment tablesId by 1 and got to step 3.
   b. Otherwise stop (step 809).
   MaxNbTables is a predefined parameter specifying the maximum number of enabled pairs of refinement tables (step 808).

In regard to aspect 3b above, in an embodiment, the refinement metadata can be derived as explained in the following. The refinement metadata represents a correcting function, noted R( ) that applies to each individual sample of a color component (e.g. the luma component Y, or the chroma components Cb/Cr). One aspect of the refinement metadata is to minimize the rate-distortion cost, between the reconstructed picture, and the original picture. The minimization can be performed over a given area A, for instance, the entire picture, a slice, a tile or a CTU. The refinement metadata are noted R. In a preferred implementation, a piece-wise linear model is used for R, defined by N couples (R_idx[k], R_val[k]), k=0 to N−1.

The process starts with the initialization of the refinement metadata R by neutral values (step 300). Neutral values are such that the refinement does not change the signal. This will be further explained below. The initial rate-distortion cost, initRD, is computed using R. The rate-distortion cost derivation using a function R will be described below. A parameter bestRD is initialized to initRD. The step of refinement metadata R optimization is then made of the following steps. A loop over the index pt of the successive pivot points of the PWL model R is performed. Parameters bestVal and initVal are initialized to R_val[pt]. A loop over various values of R_val[pt] is performed. The loop is achieved from a value (initVal−val0) to a value (initVal+Val1), where Val0 and Val1 are predefined parameters. Typical values are given below. The rate-distortion cost, curRD, is computed using the modified R (with the modified R_val[pt]). A comparison of curRD and bestRD is. If curRD is lower than bestRD, bestRD is set to curRD and bestValue is set to R_val[pt]. Next, a check is done of the end of the loop over the values of R_val[pt]. When the loop is completed, R_val[pt] is set to bestValue. Next, there is a check of the loop over the values of pt. When the loop is finished, R is the resulting metadata from the optimization process. The step of refinement metadata optimization can be iterated several times.

Next, an embodiment of the refinement process is described using the following notations:
  B is the bit depth of the signal (for instance, 10 bits)
  MaxVal is the max value of the signal, computed as $(2^B-1)$
  Sin(p) is the original (input) signal at location p in the picture
  Sout(p) is the signal resulting from the refinement, at location p in the picture
  Srec(p) is the signal to be refined. It corresponds to the signal coming from the inverse mapping for the first variant, or to the signal coming from the in-loop filters for the second variant
  NeutralVal corresponds to a pre-defined value; when the refinement value is equal to NeutralVal, the refinement does not modify the signal; a typical value for NeutralVal is 128

From the refinement metadata R, a look-up-table LutR can be built as follows.
For pt=0 to N−2
  For idx=R_idx[pt] to (R_idx[pt+1]−1)

LutR[idx]=R_val[*pt*]+(R_val[*pt*+1]−R_val[*pt*])\*(idx−R_idx[*pt*])\*(R_idx[*pt*+1]−R_idx[*pt*])

In general, at least two examples of refinement modes are defined. These examples will be referred to herein as "mode 1" or "intra-component refinement mode" and "mode 2" or "inter-component refinement mode":

In mode 1 or intra-component refinement mode, the refinement is performed independently of other components. Preferably, this mode applies to luma component and is based on the following formula:

Sout(p)=LutR[Srec(p)]/NeutralVal*Srec(p)

In mode 2 or inter-component refinement mode, the refinement is performed for one component depending on another component. Preferably, this mode applies to chroma components with dependency to luma component (noted below Srec_Y(p)). Note that Srec_Y(p) can be in the first variant the signal resulting from the in-loop filters step, or from the inverse mapping. It can also be a filtered version of the other (Y) component. The process is based on the following formula:

Sout(p)=offset+LutR[S rec_Y(p)]/NeutralVal*(S rec(p)−offset)

where offset is a in general set to (MaxVal/2), and p corresponds to the same relative position in the picture. Rounding and clipping between the minimum and maximum signal values (typically 0 and 1023 for a 10-bits signal) are finally applied to the refined values Sout(p). Here the refinement applies as a multiplicative operator mode. An additive refinement operator can also be used for the refinement. In this case, mode 1 applies as follows:

Sout(p)=LutR[Srec(p)]/NeutralVal+Srec(p)

And mode 2 applies as follows

Sout(p)=LutR[Srec_Y(p)]/NeutralVal+Srec(p)

Refinement mode 2 with multiplicative operator mode is preferred for chroma components.

Next, in an embodiment, the rate-distortion cost of a refinement metadata R can be determined as follows wherein the following notations are used:

A is the picture area for which the refinement is performed; the refinement can be performed for instance over the entire picture, a slice, a tile, a CTU.

Dist(x,y) is the distortion between a sample value x and a sample value y. Typically, the distortion is the square error $(x-y)^2$ Cost(R) is the coding cost for coding the refinement metadata R L is the lambda factor associated to the area. It is typically linearly dependent on $2^{(QP/6)}$ where QP is representative of the quantization parameter applies to the area.

The rate-distortion cost RDcost using refinement metadata R is defined as:

$$RDcost(R) = L * Cost(R) + \sum_{p \text{ in } A} dist(Sin(p), Sout(p))$$

R is built so that the total rate-distortion cost between the original signal Sin(p), and the refined signal Sout(p) is minimized.

In general, an embodiment provides coding gain, that is, increasing of the quality for a same bitrate, or decreasing the bitrate for a same quality. The gain of refinement with block-based activation is shown in the tables below. In the non-limiting example shown below, only one table per component is allowed (K, or equivalently refinement_number_of_tables, is equal to 1).

The performance is shown on 5 HDR HD 10-bit content, 5 SDR HD 8-bit content, and 2 SDR HD 10-bit content. The used codec is the VTM (Versatile Video Coding (VVC) Test Model), with QTBT (quadtree plus binary tree block partitioning structure) activated. All sequences are coded with 10-bit internal bit-depth. The tables below depict coding results on sequences of 17 frames, in random access configuration. neutraVal is set to 64, and tables size is set to 17. Refinement metadata coding is only applied for temporal level 0.

The five tables below show the BD-rate gain as follows: table 1 when applying the refinement for all blocks ("refine full slice"), table 2 to 4 when enabling the activation of refinement per blocks of size 128×128 ("refine blk128"), 64×64 ("refine blk64") and 32×32 ("refine blk32"), and table 5 when selecting the best configuration for each content. The results show a benefit or improvement of using the block-based refinement activation.

TABLE 1

Results when applying the refinement for all blocks.

| refine full slice | Y psnr | U psnr | V psnr | YUV psnr |
| --- | --- | --- | --- | --- |
| cosmos | 0.0% | −16.3% | −25.3% | −1.1% |
| hurdles | 0.0% | −11.1% | −20.6% | −1.3% |
| market | 0.1% | −1.9% | −0.9% | 0.0% |
| showgirl | 0.0% | −15.5% | −9.6% | −1.0% |
| starting | 0.1% | −2.7% | −10.8% | −0.6% |
| bbdrive | 0.1% | −1.2% | −2.4% | −0.1% |
| bqterrace | −0.1% | −3.4% | −6.1% | −0.4% |
| cactus | 0.1% | −2.4% | −0.5% | −0.1% |
| kimono | 0.2% | −4.1% | −0.4% | −0.1% |
| parkscene | 0.0% | −5.2% | −0.7% | −0.4% |
| marketplace | 0.1% | −4.7% | −4.9% | −0.2% |
| ritualdance | 0.0% | −1.1% | −0.1% | 0.0% |
| average | 0.1% | −5.8% | −6.9% | −0.4% |

TABLE 2

Results when enabling the activation of refinement per blocks of size 128 × 128.

| refine blk128 | Y psnr | U psnr | V psnr | YUV psnr |
| --- | --- | --- | --- | --- |
| cosmos | 0.1% | −17.4% | −25.3% | −1.1% |
| hurdles | 0.1% | −10.7% | −20.8% | −1.2% |
| market | 0.0% | −2.6% | −1.5% | −0.1% |
| showgirl | 0.1% | −18.3% | −9.8% | −1.1% |
| starting | 0.1% | −4.5% | −12.5% | −0.8% |
| bbdrive | 0.1% | −1.9% | −2.4% | −0.1% |
| bqterrace | 0.0% | −3.6% | −6.7% | −0.3% |
| cactus | 0.1% | −3.0% | −0.9% | −0.1% |
| kimono | 0.2% | −4.1% | −0.8% | 0.0% |
| parkscene | 0.0% | −5.6% | −0.7% | −0.3% |
| marketplace | 0.0% | −5.5% | −6.4% | −0.4% |
| ritualdance | −0.2% | −1.5% | −0.7% | −0.3% |
| average | 0.0% | −6.6% | −7.4% | −0.5% |

TABLE 3

Results when enabling the activation of refinement per blocks of size 64 × 64.

| refine blk64 | Y psnr | U psnr | V psnr | YUV psnr |
| --- | --- | --- | --- | --- |
| cosmos | 0.1% | −17.4% | −25.3% | −1.1% |
| hurdles | 0.1% | −11.0% | −20.9% | −1.2% |
| market | 0.0% | −4.2% | −2.2% | −0.1% |
| showgirl | 0.2% | −20.7% | 10.1% | −1.1% |
| starting | 0.2% | −6.0% | −13.0% | −0.9% |
| bbdrive | 0.0% | −2.5% | −2.0% | −0.2% |
| bqterrace | 0.1% | −3.9% | −6.7% | −0.2% |
| cactus | 0.0% | −2.7% | −0.9% | −0.2% |
| kimono | 0.2% | −4.3% | −1.4% | −0.1% |

TABLE 3-continued

Results when enabling the activation of refinement per blocks of size 64 × 64.

| refine blk64 | Y psnr | U psnr | V psnr | YUV psnr |
|---|---|---|---|---|
| parkscene | 0.0% | −6.5% | −1.0% | −0.4% |
| marketplace | 0.1% | −5.7% | −8.2% | −0.4% |
| ritualdance | 0.1%. | −1.3% | −0.4% | 0.0% |
| average | 0.1% | −7.2% | −7.7% | −0.5% |

TABLE 4

Results when enabling the activation of refinement per blocks of size 32 × 32.

| refine blk32 | Y psnr | U psnr | U psnr | YUV psnr |
|---|---|---|---|---|
| cosmos | 0.0% | −18.5% | −27.0% | −1.3% |
| hurdles | 0.1% | −12.4% | −21.2% | −1.3% |
| market | 0.1% | −6.1% | −2.8% | 0.0% |
| showgirl | 0.3% | −22.6% | −11.3% | −1.1% |
| starting | 0.3% | −7.6% | −13.7% | −0.9% |
| bbdrive | 0.1% | −3.3% | −3.3% | −0.2% |
| bqterrace | 0.1% | −4.6% | −7.6% | −0.2% |
| cactus | 0.2% | −3.1% | −0.9% | 0.0% |
| kimono | 0.2% | −5.2% | −1.6% | −0.2% |
| parkscene | 0.1% | −7.1% | −1.2% | −0.4% |
| marketplace | 0.2% | −6.8% | −8.9% | −0.3% |
| ritualdance | 0.2% | −1.2% | −1.0% | 0.1% |
| average | 0.2% | −8.2% | −8.4% | −0.5% |

TABLE 5

Results when selecting the best result for each sequence

| best | Y psnr | U psnr | V psnr | YUV psnr |
|---|---|---|---|---|
| cosmos | 0.0% | −18.5% | −27.0% | −1.3% |
| hurdles | 0.1% | −12.4% | −21.2% | −1.3% |
| market | 0.0% | −2.6% | −1.5% | −0.1% |
| showgirl | 0.2% | −20.7% | −10.1% | −1.1% |
| starting | 0.3% | −7.6% | −13.7% | −0.9% |
| bbdrive | 0.0% | −2.5% | −2.0% | −0.2% |
| bqterrace | −0.1% | −3.4% | −6.1% | −0.4% |
| cactus | 0.0% | −2.7% | −0.9% | −0.2% |
| kimono | 0.2% | −5.2% | −1.6% | −0.2% |
| parkscene | 0.0% | −6.5% | −1.0% | −0.4% |
| marketplace | 0.1% | −5.7% | −8.2% | −0.4% |
| ritualdance | −0.2% | −1.5% | −0.7% | −0.3% |
| average | 0.0% | −7.4% | −7.8% | −0.6% |

This document describes various examples of embodiments, features, models, approaches, etc. Many such examples are described with specificity and, at least to show the individual characteristics, are often described in a manner that may appear limiting. However, this is for purposes of clarity in description, and does not limit the application or scope. Indeed, the various examples of embodiments, features, etc., described herein can be combined and interchanged in various ways to provide further examples of embodiments.

In general, the examples of embodiments described and contemplated in this document can be implemented in many different forms. FIGS. 1 and 2 described above and FIG. 15 described below provide some embodiments, but other embodiments are contemplated and the discussion of FIGS. 1, 2 and 15 does not limit the breadth of the implementations. At least one embodiment generally provides an example related to video encoding and/or decoding, and at least one other embodiment generally relates to transmitting a bitstream or signal generated or encoded. These and other embodiments can be implemented as a method, an apparatus, a computer readable storage medium having stored thereon instructions for encoding or decoding video data according to any of the methods described, and/or a computer readable storage medium having stored thereon a bitstream or signal generated according to any of the methods described.

In the present application, the terms "reconstructed" and "decoded" may be used interchangeably, the terms "pixel" and "sample" may be used interchangeably, the terms "image," "picture" and "frame" may be used interchangeably. Usually, but not necessarily, the term "reconstructed" is used at the encoder side while "decoded" is used at the decoder side.

The terms HDR (high dynamic range) and SDR (standard dynamic range) are used in this disclosure. Those terms often convey specific values of dynamic range to those of ordinary skill in the art. However, additional embodiments are also intended in which a reference to HDR is understood to mean "higher dynamic range" and a reference to SDR is understood to mean "lower dynamic range". Such additional embodiments are not constrained by any specific values of dynamic range that might often be associated with the terms "high dynamic range" and "standard dynamic range".

Various methods are described herein, and each of the methods comprises one or more steps or actions for achieving the described method. Unless a specific order of steps or actions is required for proper operation of the method, the order and/or use of specific steps and/or actions may be modified or combined.

Various methods and other aspects described in this document can be used to modify modules, for example, the intra prediction, entropy coding, and/or decoding modules (160, 360, 145, 330), of a video encoder 100 and decoder 200 as shown in FIG. 1 and FIG. 2. Moreover, the present aspects are not limited to VVC or HEVC, and can be applied, for example, to other standards and recommendations, whether pre-existing or future-developed, and extensions of any such standards and recommendations (including VVC and HEVC). Unless indicated otherwise, or technically precluded, the aspects described in this document can be used individually or in combination.

Various numeric values are used in the present document, for example. The specific values are for example purposes and the aspects described are not limited to these specific values.

FIG. 15 illustrates a block diagram of an example of a system in which various aspects and embodiments can be implemented. System 1000 can be embodied as a device including the various components described below and is configured to perform one or more of the aspects described in this document. Examples of such devices, include, but are not limited to, various electronic devices such as personal computers, laptop computers, smartphones, tablet computers, digital multimedia set top boxes, digital television receivers, personal video recording systems, connected home appliances, and servers. Elements of system 1000, singly or in combination, can be embodied in a single integrated circuit, multiple ICs, and/or discrete components. For example, in at least one embodiment, the processing and encoder/decoder elements of system 1000 are distributed across multiple ICs and/or discrete components. In various embodiments, the system 1000 is communicatively coupled to other similar systems, or to other electronic devices, via, for example, a communications bus or through dedicated input and/or output ports. In various embodiments, the system 1000 is configured to implement one or more of the aspects described in this document.

The system 1000 includes at least one processor 1010 configured to execute instructions loaded therein for implementing, for example, the various aspects described in this document. Processor 1010 can include embedded memory, input output interface, and various other circuitries as known in the art. The system 1000 includes at least one memory 1020 (e.g., a volatile memory device, and/or a non-volatile memory device). System 1000 includes a storage device 1040, which can include non-volatile memory and/or volatile memory, including, but not limited to, EEPROM, ROM, PROM, RAM, DRAM, SRAM, flash, magnetic disk drive, and/or optical disk drive. The storage device 1040 can include an internal storage device, an attached storage device, and/or a network accessible storage device, as non-limiting examples.

System 1000 includes an encoder/decoder module 1030 configured, for example, to process data to provide an encoded video or decoded video, and the encoder/decoder module 1030 can include its own processor and memory. The encoder/decoder module 1030 represents module(s) that can be included in a device to perform the encoding and/or decoding functions. As is known, a device can include one or both of the encoding and decoding modules. Additionally, encoder/decoder module 1030 can be implemented as a separate element of system 1000 or can be incorporated within processor 1010 as a combination of hardware and software as known to those skilled in the art.

Program code to be loaded onto processor 1010 or encoder/decoder 1030 to perform the various aspects described in this document can be stored in storage device 1040 and subsequently loaded onto memory 1020 for execution by processor 1010. In accordance with various embodiments, one or more of processor 1010, memory 1020, storage device 1040, and encoder/decoder module 1030 can store one or more of various items during the performance of the processes described in this document. Such stored items can include, but are not limited to, the input video, the decoded video or portions of the decoded video, the bitstream or signal, matrices, variables, and intermediate or final results from the processing of equations, formulas, operations, and operational logic.

In several embodiments, memory inside of the processor 1010 and/or the encoder/decoder module 1030 is used to store instructions and to provide working memory for processing that is needed during encoding or decoding. In other embodiments, however, a memory external to the processing device (for example, the processing device can be either the processor 1010 or the encoder/decoder module 1030) is used for one or more of these functions. The external memory can be the memory 1020 and/or the storage device 1040, for example, a dynamic volatile memory and/or a non-volatile flash memory. In several embodiments, an external non-volatile flash memory is used to store the operating system of a television. In at least one embodiment, a fast external dynamic volatile memory such as a RAM is used as working memory for video coding and decoding operations, such as for MPEG-2, HEVC, or VVC (Versatile Video Coding).

The input to the elements of system 1000 can be provided through various input devices as indicated in block 1130. Such input devices include, but are not limited to, (i) an RF portion that receives an RF signal transmitted, for example, over the air by a broadcaster, (ii) a Composite input terminal, (iii) a USB input terminal, and/or (iv) an HDMI input terminal.

In various embodiments, the input devices of block 1130 have associated respective input processing elements as known in the art. For example, the RF portion can be associated with elements for (i) selecting a desired frequency (also referred to as selecting a signal, or band-limiting a signal to a band of frequencies), (ii) downconverting the selected signal, (iii) band-limiting again to a narrower band of frequencies to select (for example) a signal frequency band which can be referred to as a channel in certain embodiments, (iv) demodulating the downconverted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, downconverting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, downconverting, and filtering again to a desired frequency band. Various embodiments rearrange the order of the above-described (and other) elements, remove some of these elements, and/or add other elements performing similar or different functions. Adding elements can include inserting elements in between existing elements, for example, inserting amplifiers and an analog-to-digital converter. In various embodiments, the RF portion includes an antenna.

Additionally, the USB and/or HDMI terminals can include respective interface processors for connecting system 1000 to other electronic devices across USB and/or HDMI connections. It is to be understood that various aspects of input processing, for example, Reed-Solomon error correction, can be implemented, for example, within a separate input processing IC or within processor 1010. Similarly, aspects of USB or HDMI interface processing can be implemented within separate interface ICs or within processor 1010. The demodulated, error corrected, and demultiplexed stream is provided to various processing elements, including, for example, processor 1010, and encoder/decoder 1030 operating in combination with the memory and storage elements to process the datastream for presentation on an output device.

Various elements of system 1000 can be provided within an integrated housing, Within the integrated housing, the various elements can be interconnected and transmit data therebetween using suitable connection arrangement 1140, for example, an internal bus as known in the art, including the I2C bus, wiring, and printed circuit boards.

The system 1000 includes communication interface 1050 that enables communication with other devices via communication channel 1060. The communication interface 1050 can include, but is not limited to, a transceiver configured to transmit and to receive data over communication channel 1060. The communication interface 1050 can include, but is not limited to, a modem or network card and the communication channel 1060 can be implemented, for example, within a wired and/or a wireless medium.

Data is streamed to the system 1000, in various embodiments, using a Wi-Fi network such as IEEE 802.11. The Wi-Fi signal of these embodiments is received over the communications channel 1060 and the communications interface 1050 which are adapted for Wi-Fi communications. The communications channel 1060 of these embodiments is typically connected to an access point or router that provides access to outside networks including the Internet for allowing streaming applications and other over-the-top communications. Other embodiments provide streamed data to the system 1000 using a set-top box that delivers the data over the HDMI connection of the input block 1130. Still other embodiments provide streamed data to the system 1000 using the RF connection of the input block 1130.

The system 1000 can provide an output signal to various output devices, including a display 1100, speakers 1110, and other peripheral devices 1120. The other peripheral devices 1120 include, in various examples of embodiments, one or more of a stand-alone DVR, a disk player, a stereo system, a lighting system, and other devices that provide a function based on the output of the system 1000. In various embodiments, control signals are communicated between the system 1000 and the display 1100, speakers 1110, or other peripheral devices 1120 using signaling such as AV.Link, CEC, or other communications protocols that enable device-to-device control with or without user intervention. The output devices can be communicatively coupled to system 1000 via dedicated connections through respective interfaces 1070, 1080, and 1090. Alternatively, the output devices can be connected to system 1000 using the communications channel 1060 via the communications interface 1050. The display 1100 and speakers 1110 can be integrated in a single unit with the other components of system 1000 in an electronic device, for example, a television. In various embodiments, the display interface 1070 includes a display driver, for example, a timing controller (T Con) chip.

The display 1100 and speaker 1110 can alternatively be separate from one or more of the other components, for example, if the RF portion of input 1130 is part of a separate set-top box. In various embodiments in which the display 1100 and speakers 1110 are external components, the output signal can be provided via dedicated output connections, including, for example, HDMI ports, USB ports, or COMP outputs.

The embodiments can be carried out by computer software implemented by the processor 1010 or by hardware, or by a combination of hardware and software. As a non-limiting example, the embodiments can be implemented by one or more integrated circuits. The memory 1020 can be of any type appropriate to the technical environment and can be implemented using any appropriate data storage technology, such as optical memory devices, magnetic memory devices, semiconductor-based memory devices, fixed memory, and removable memory, as non-limiting examples. The processor 1010 can be of any type appropriate to the technical environment, and can encompass one or more of microprocessors, general purpose computers, special purpose computers, and processors based on a multi-core architecture, as non-limiting examples.

The following describes FIGS. 16 through 30 which, in general, depict various other examples of embodiments suitable for implementing one or more aspects described herein.

Figure 16:
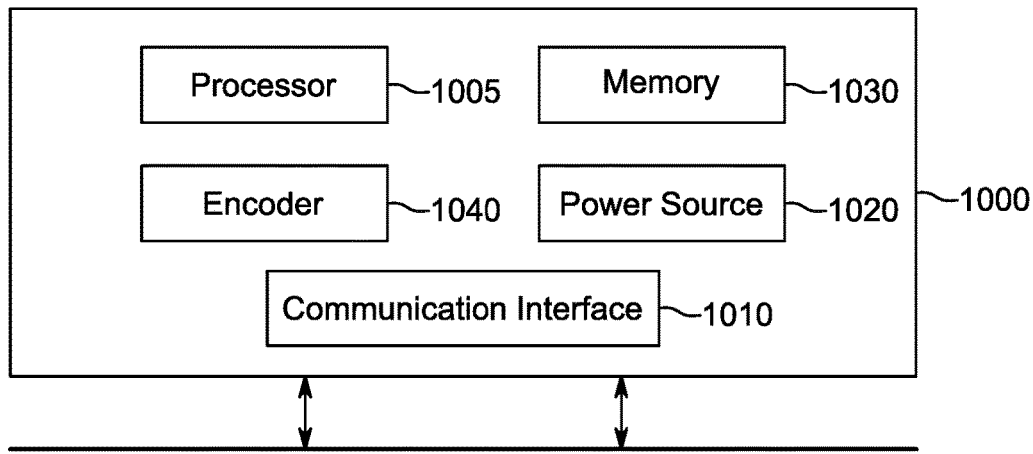
FIG. 16 provides a block diagram depicting an example of an embodiment of a system such as a transmitter including video encoding.

FIG. 16 represents an example of an architecture of a transmitter 1000 configured to encode a picture in a bitstream according to a specific and non-limiting embodiment.

The transmitter 1000 comprises one or more processor(s) 1005, which could comprise, for example, a CPU, a GPU and/or a DSP (English acronym of Digital Signal Processor), along with internal memory 1030 (e.g. RAM, ROM, and/or EPROM). The transmitter 1000 comprises one or more communication interface(s) 1010 (e.g. a keyboard, a mouse, a touchpad, a webcam), each adapted to display output information and/or allow a user to enter commands and/or data; and a power source 1020 which may be external to the transmitter 1000. The transmitter 1000 may also comprise one or more network interface(s) (not shown). Encoder module 1040 represents the module that may be included in a device to perform the coding functions. Additionally, encoder module 1040 may be implemented as a separate element of the transmitter 1000 or may be incorporated within processor(s) 1005 as a combination of hardware and software as known to those skilled in the art.

The picture may be obtained from a source. According to different embodiments, the source can be, but is not limited to:
- a local memory, e.g. a video memory, a RAM, a flash memory, a hard disk;
- a storage interface, e.g. an interface with a mass storage, a ROM, an optical disc or a magnetic support;
- a communication interface, e.g. a wireline interface (for example a bus interface, a wide area network interface, a local area network interface) or a wireless interface (such as a IEEE 802.11 interface or a Bluetooth interface); and
- a picture capturing circuit (e.g. a sensor such as, for example, a CCD (or Charge-Coupled Device) or CMOS (or Complementary Metal-Oxide-Semiconductor)).

According to different embodiments, the bitstream may be sent to a destination. As an example, the bitstream is stored in a remote or in a local memory, e.g. a video memory or a RAM, a hard disk. In a variant, the bitstream is sent to a storage interface, e.g. an interface with a mass storage, a ROM, a flash memory, an optical disc or a magnetic support and/or transmitted over a communication interface, e.g. an interface to a point to point link, a communication bus, a point to multipoint link or a broadcast network.

According to a non-limiting example of an embodiment, the transmitter 1000 further comprises a computer program stored in the memory 1030. The computer program comprises instructions which, when executed by the transmitter 1000, in particular by the processor 1005, enable the transmitter 1000 to execute the encoding method described with reference to FIG. 20. According to a variant, the computer program is stored externally to the transmitter 1000 on a non-transitory digital data support, e.g. on an external storage medium such as a HDD, CD-ROM, DVD, a read-only and/or DVD drive and/or a DVD Read/Write drive, all known in the art. The transmitter 1000 thus comprises a mechanism to read the computer program.

Further, the transmitter 1000 could access one or more Universal Serial Bus (USB)-type storage devices (e.g., "memory sticks.") through corresponding USB ports (not shown).

According to one or more non-limiting examples of embodiments, the transmitter 1000 can be, but is not limited to:
- a mobile device;
- a communication device;
- a game device;
- a tablet (or tablet computer);
- a laptop;
- a still picture camera;
- a video camera;
- an encoding chip or encoding device/apparatus;
- a still picture server; and a video server (e.g. a broadcast server, a video-on-demand server or a web server).

Figure 17:
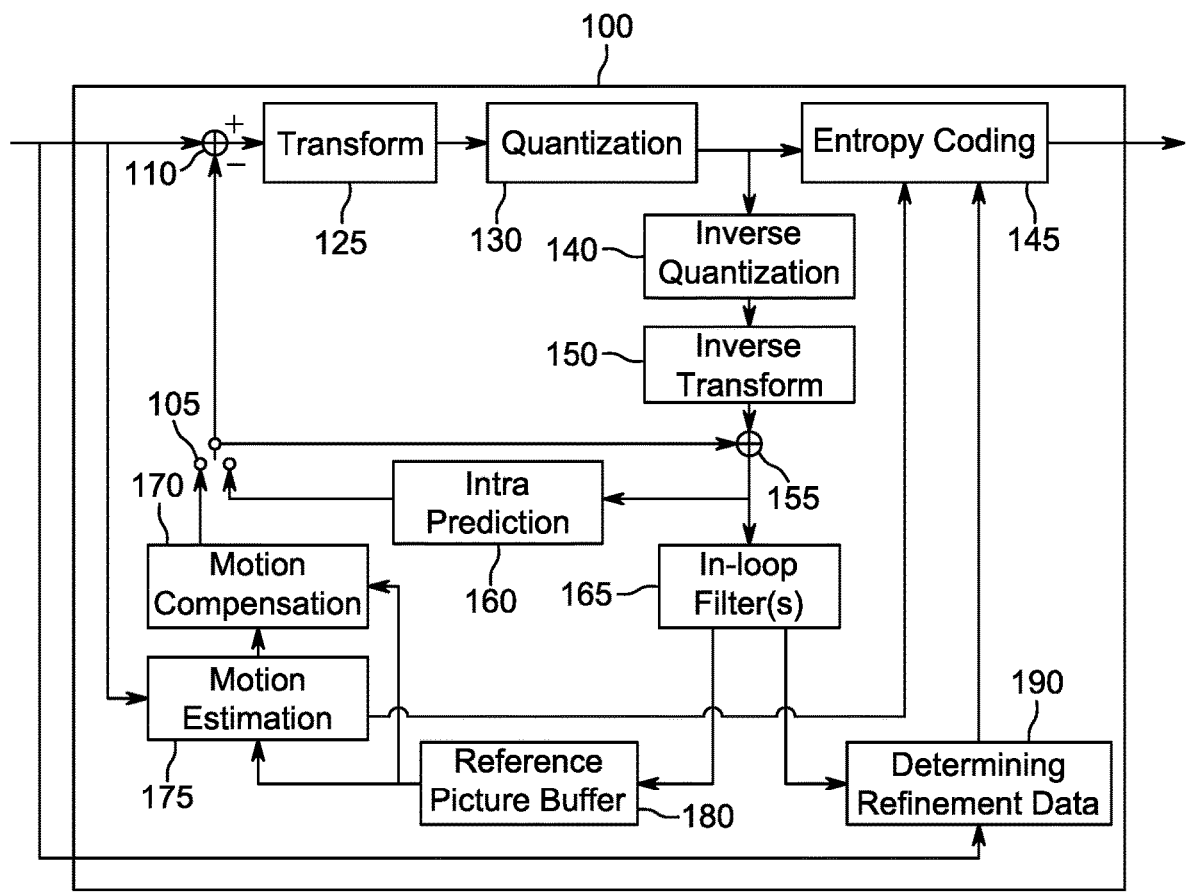
FIG. 17 provides a block diagram depicting another example of an embodiment of a video encoder.
Figure 20:
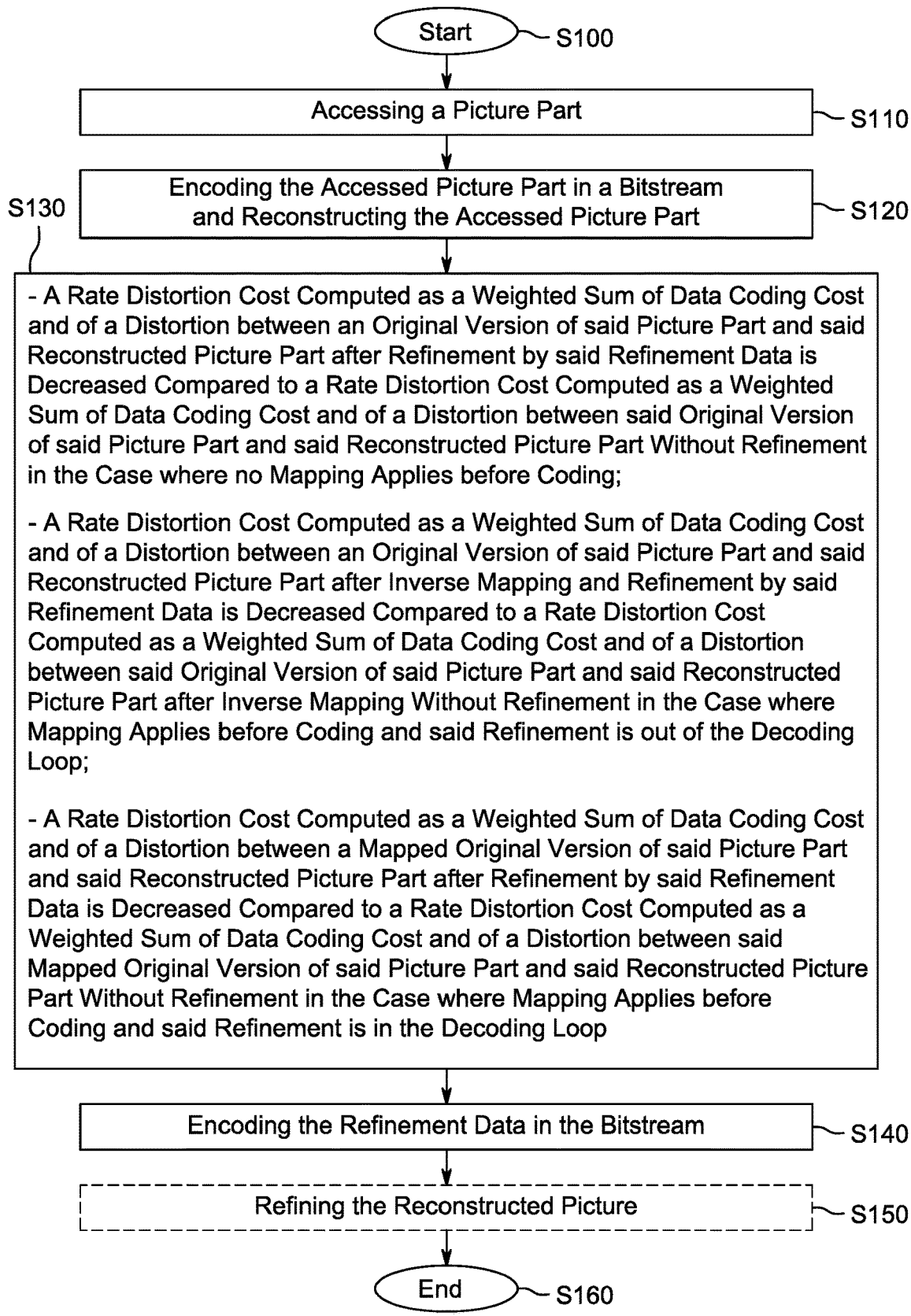
FIG. 20 provides a flow diagram depicting an example of an embodiment of a process for video encoding.

FIG. 17 illustrates an example of a video encoder 100, e.g. an encoder of HEVC type, adapted to execute the encoding method of FIG. 20. The encoder 100 is an example of a transmitter 1000 or part of such a transmitter 1000.

For coding, a picture is usually partitioned into basic coding units, e.g. into coding tree units (CTU) in HEVC or into macroblock units in H.264. A set of possibly consecutive basic coding units is grouped into a slice. A basic coding unit contains the basic coding blocks of all color components. In HEVC, the smallest coding tree block (CTB) size 16×16 corresponds to a macroblock size as used in previous video coding standards. It will be understood that, although the terms CTU and CTB are used herein to describe encoding/decoding methods and encoding/decoding apparatus, these methods and apparatus should not be limited by these specific terms that may be worded differently (e.g. macroblock) in other standards such as H.264.

In HEVC coding, a picture is partitioned into CTUs of square shape with a configurable size typically 64×64, 128×128, or 256×256. A CTU is the root of a quad-tree partitioning into 4 square Coding Units (CU) of equal size, i.e. half of the parent block size in width and in height. A quad-tree is a tree in which a parent node can be split into four child nodes, each of which may become parent node for another split into four child nodes. In HEVC, a coding Block (CB) is partitioned into one or more Prediction Blocks (PB) and forms the root of a quadtree partitioning into Transform Blocks (TBs). Corresponding to the Coding Block, Prediction Block and Transform Block, a Coding Unit (CU) includes the Prediction Units (PUs) and the tree-structured set of Transform Units (TUs), a PU includes the prediction information for all color components, and a TU includes residual coding syntax structure for each color component. The size of a CB, PB and TB of the luma component applies to the corresponding CU, PU and TU.

In more recent encoding systems, a CTU is the root of a coding tree partitioning into Coding Units (CU). A coding tree is a tree in which a parent node (usually corresponding to a CU) can be split into child nodes (e.g. into 2, 3 or 4 child nodes), each of which may become parent node for another split into child nodes. In addition to the quad-tree split mode, new split modes (binary tree symmetric split modes, binary tree asymmetric split modes and triple tree split modes) are also defined that increase the total number of possible split modes. The coding tree has a unique root node, e.g. a CTU. A leaf of the coding tree is a terminating node of the tree. Each node of the coding tree represents a CU that may be further split into smaller CUs also named sub-CUs or more generally sub-blocks. Once the partitioning of a CTU into CUs is determined, CUs corresponding to the leaves of the coding tree are encoded. The partitioning of a CTU into CUs and the coding parameters used for encoding each CU (corresponding to a leaf of the coding tree) may be determined on the encoder side through a rate distortion optimization procedure. There is no partitioning of a CB into PBs and TBs, i.e. a CU is made of a single PU and a single TU.

In the following, the term "block" or "picture block" can be used to refer to any one of a CTU, a CU, a PU, a TU, a CB, a PB and a TB. In addition, the term "block" or "picture block" can be used to refer to a macroblock, a partition and a sub-block as specified in H.264/AVC or in other video coding standards, and more generally to refer to an array of samples of numerous sizes.

Back to FIG. 17, in the example of an embodiment of an encoder 100, a picture is encoded by the encoder elements as described below. The picture to be encoded is processed in units of CUs. Each CU is encoded using either an intra or inter mode. When a CU is encoded in an intra mode, it performs intra prediction (160). In an inter mode, motion estimation (175) and compensation (170) are performed. The encoder decides (105) which one of the intra mode or inter mode to use for encoding the CU, and indicates the intra/inter decision by a prediction mode flag. Residuals are calculated by subtracting (110) a predicted sample block (also known as a predictor) from the original picture block.

CUs in intra mode are predicted from reconstructed neighboring samples, e.g. within the same slice. A set of 35 intra prediction modes is available in HEVC, including a DC, a planar, and 33 angular prediction modes. CUs in inter mode are predicted from reconstructed samples of a reference picture stored in a reference picture buffer (180).

The residuals are transformed (125) and quantized (130). The quantized transform coefficients, as well as motion vectors and other syntax elements, are entropy coded (145) to output a bitstream. The encoder may also skip the transform or bypass both transform and quantization, i.e., the residual is coded directly without the application of the transform or quantization processes.

The entropy coding may be, e.g., Context Adaptive Binary Arithmetic Coding (CABAC), Context Adaptive Variable Length Coding (CAVLC), Huffman, arithmetic, exp-Golomb, etc. CABAC is a method of entropy coding first introduced in H.264 and also used in HEVC. CABAC involves binarization, context modeling and binary arithmetic coding. Binarization maps the syntax elements to binary symbols (bins). Context modeling determines the probability of each regularly coded bin (i.e. non-bypassed) based on some specific context. Finally, binary arithmetic coding compresses the bins to bits according to the determined probability.

The encoder comprises a decoding loop and thus decodes an encoded block to provide a reference for further predictions. The quantized transform coefficients are de-quantized (140) and inverse transformed (150) to decode residuals. A picture block is reconstructed by combining (155) the decoded residuals and the predicted sample block. Optionally, in-loop filter(s) (165) is applied to the reconstructed picture, for example, to perform DBF (DeBlocking Filter)/SAO (Sample Adaptive Offset)/ALF (Adaptive Loop Filtering) to reduce coding artifacts. The filtered picture may be stored in a reference picture buffer (180) and used as reference for other pictures. In the present embodiment, refinement data are determined (190) from the filtered reconstructed picture, i.e. output of the in-loop filter(s), and its original version. In a first variant, refinement data are determined (190) from the reconstructed picture before in-loop filtering and its original version. In this first variant, refinement is applied before in-loop filtering. In a second variant, refinement data are determined (190) from the reconstructed picture partially filtered, e.g. after deblocking filtering but before SAO, and its original version. In this second variant, refinement is applied after, e.g., immediately after the partial filtering, e.g., after deblocking filtering but before SAO. The refinement data are representative of a correcting function, noted R( ) that applies to individual sample(s) of a color component (e.g. the luma component Y, or the chroma components Cb/Cr, or the color components R, G, or B). The refinement data are then entropy coded in the bitstream. In this embodiment, the refinement process is out of the decoding loop. Therefore, the refinement process is only applied in the decoder as a post-processing.

Figure 18:
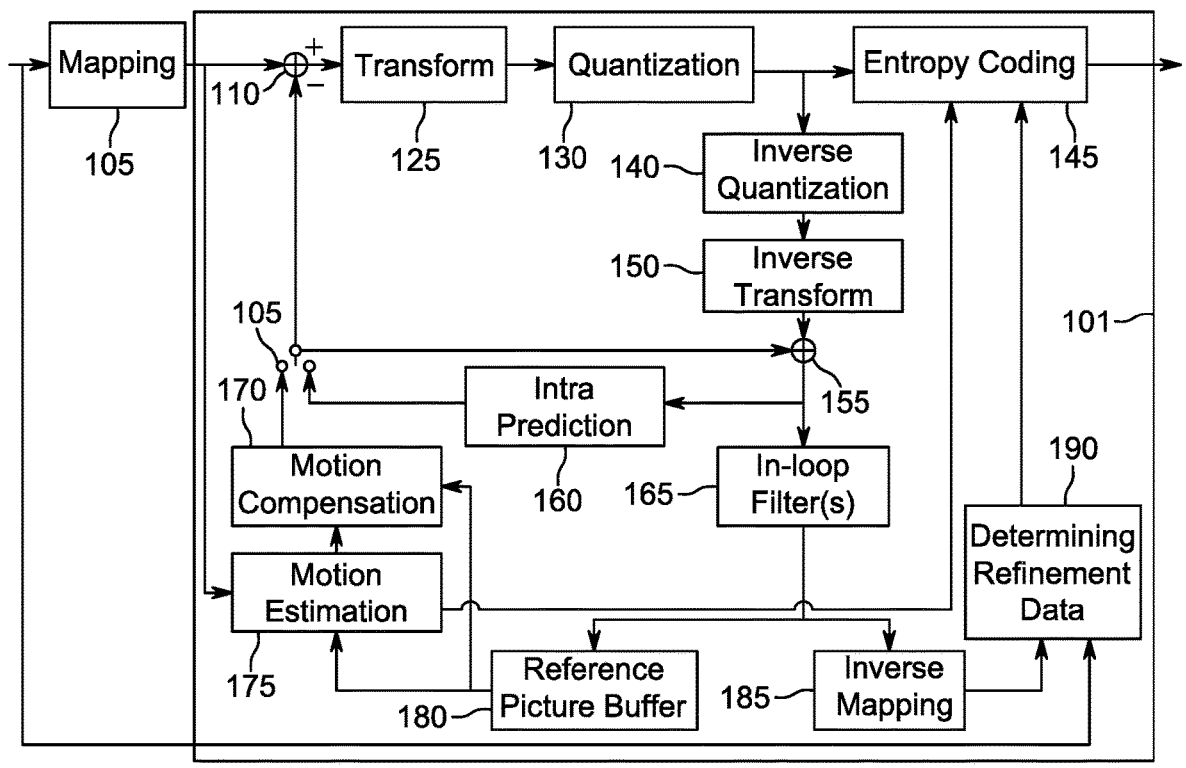
FIG. 18 provides a block diagram depicting another example of an embodiment of a video encoder.

FIG. 18 illustrates a variant 101 of the video encoder 100 of FIG. 17. The modules of FIG. 18 identical to the modules of FIG. 17 are labelled with the same numerical references and are not further described. Before being encoded by the video encoder 101, a picture may be mapped (105). Such mapping may be used to better exploit the sample codewords values distribution of the pictures. In general, mapping applies on the original (input) samples prior to core encoding as illustrated in FIG. 18. Usually, static mapping functions, i.e. the same functions for all content, are used in order to limit the complexity. The mapping function fmap( ), possibly modeled by a 1D look-up-table LUTmap [x], x being a value, directly applies to the input signal x as follows:

y=fmap(x) or y=LUTmap[x]

where x is the input signal (for instance from 0 to 1023 for a 10-bit signal) and y is the mapped signal.

In a variant, the mapping function for one component depends on another component (cross-component mapping function). For instance, the chroma component c is mapped depending on the luma component y located at the same relative position in the picture. Chroma component c is mapped as follows:

c=offset+fmap (y)*(c−offset) or c=offset+LUTmap [y] *(c−offset)

where offset is usually the center value of the chroma signal (for instance 512 for a 10-bit chroma signal). This parameter can also be a dynamic parameter, coded in the stream, which may end-up in improved compression gains.

The mapping functions can be defined by default, or signaled in the bitstream, e.g. using piece-wise linear models, scaling tables, or delta QP (dQP) tables.

The filtered reconstructed picture, i.e. the output of the in-loop filter(s), is inverse mapped (185). The inverse mapping (185) is an implementation of the inverse process of the mapping (105). Refinement data are determined (190) from the filtered reconstructed picture after inverse mapping and its original version. The refinement data are then entropy coded in the bitstream. In this embodiment, the refinement process is out of the decoding loop. Therefore, the refinement process is only applied in the decoder as a post-processing.

Figure 19:
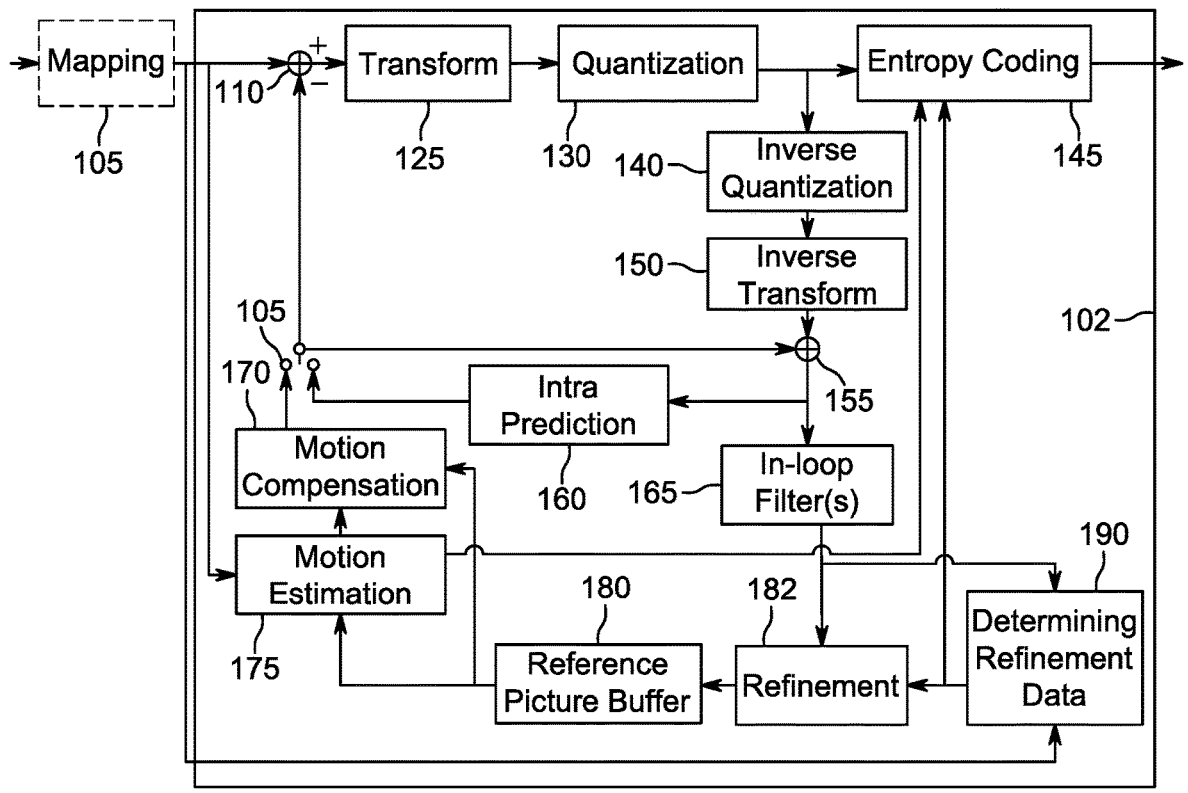
FIG. 19 provides a block diagram depicting another example of an embodiment of a video encoder.

FIG. 19 illustrates a variant 102 of the video encoder 100 of FIG. 17. The modules of FIG. 19 identical to the modules of FIG. 17 are labelled with the same numerical references and are not further described. The mapping module 105 is optional. Refinement data are determined (190) from the filtered reconstructed picture, i.e. output of the in-loop filter(s), and its original version when mapping does not apply, or from its mapped original version when mapping applies. The refinement data are then entropy coded (145) in the bitstream. The filtered reconstructed picture is also refined (182) using the refinement data. The refined picture is stored in the reference picture buffer (180) instead of the filtered reconstructed picture. In this embodiment, the refinement process is an in-loop process, i.e. it is part of the decoding loop. Therefore, the refinement process applies both in the decoding loop of the encoder and of the decoder. The modules 182 and 190 may be inserted in different locations. The module 182 of refinement may be inserted before the in-loop filter(s) or in between the in-loop filter(s) in case of at least two in-loop filters, e.g. after the DBF and before the SAO. The module 190 is positioned so that it takes as input the same picture as the refinement module 182, i.e. the reconstructed picture in the case where the module 182 is before the in-loop filters, the partially filtered reconstructed picture in the case where the module 182 is in-between the in-loop filters.

FIG. 20 represents a flowchart of a method for encoding a picture part in a bitstream according to a specific and non-limiting embodiment. The method starts at step S100. At step S110, a transmitter 1000, e.g. such as the encoder 100, 101 or 102, accesses a picture part. Before being encoded the accessed picture part may optionally be mapped as in FIGS. 18 and 19. At step S120, the transmitter encodes and reconstructs the accessed picture part in order to obtain a reconstructed picture part. To this aim, the picture part may be split into blocks. Encoding the picture part comprises encoding the blocks of the picture part. Encoding a block usually but not necessarily comprises subtracting a predictor from the block to obtain a block of residuals, transforming the block of residuals into a block of transform coefficients, quantizing the block of coefficients with a quantization step size to obtain a quantized block of transform coefficients and entropy coding the quantized block of transform coefficients in the bitstream. Reconstructing a block on the encoder side usually but not necessarily comprises de-quantizing and inverse transforming the quantized block of transform coefficients to obtain a block of residuals and adding the predictor to the block of residuals to obtain a decoded block. The reconstructed picture part may then be filtered by in-loop filters(s), e.g. deblocking/SAO/ALF filters as in FIGS. 17-19 and also inverse mapped as in FIG. 18.

At step S130, refinement data are determined, e.g. by the module 190, such that a rate distortion cost computed as a weighted sum of data coding cost (i.e. coding cost of refinement data and of the refined picture part) and of a distortion between an original version of the picture part, i.e. the accessed image part, possibly mapped as in FIG. 19 and the reconstructed picture part possibly filtered as in FIGS. 17 and 19 or inverse mapped as in FIG. 18 and refined is decreased or minimized. More precisely, the refinement data are determined such that:

a rate distortion cost computed as a weighted sum of data coding cost (i.e. coding cost of refinement data and of the refined picture part) and of a distortion between an original version of said picture part and said reconstructed picture part after refinement by said refinement data is decreased compared to a rate distortion cost computed as a weighted sum of data coding cost (i.e. coding cost of the picture part without refinement) and of a distortion between said original version of said picture part and said reconstructed picture part without refinement in the case where no mapping applies before coding as in FIG. 17 and FIG. 19 without mapping;

a rate distortion cost computed as a weighted sum of data coding cost (coding cost of refinement data and of the refined picture part) and of a distortion between an original version of said picture part and said reconstructed picture part after inverse mapping and refinement by said refinement data is decreased compared to a rate distortion cost computed as a weighted sum of data coding cost and of a distortion between said original version of said picture part and said reconstructed picture part after inverse mapping without refinement in the case where mapping applies before coding and said refinement is out of the decoding loop as in FIG. 18 (with mapping and out of the loop refinement);

a rate distortion cost computed as a weighted sum of data coding cost and of a distortion between a mapped original version of said picture part and said reconstructed picture part after refinement by said refinement data is decreased compared to a rate distortion cost computed as a weighted sum of data coding cost and of a distortion between said mapped original version of said picture part and said reconstructed picture part without refinement in the case where mapping applies before coding and said refinement is in the decoding loop as in FIG. 19 with mapping.

The reconstructed picture part used to determine refinement data may be the in-loop filtered version or the in-loop partially filtered version of the reconstructed picture part.

In a specific and non-limiting embodiment, the refinement data noted R are advantageously modeled by a piece-wise linear model (PWL), defined by N couples (R_idx[k], R_val [k]), k=0 to N−1. Each couple defines a pivot point of the PWL model. The step S130 is detailed on FIGS. 21-26. R_idx[k] is typically a value in the range of the considered signal, for instance in the range 0 to 1023 for a 10-bit signal. Advantageously, R_idx[k] is greater than R_idx[k−1].

At step S140, the refinement data are encoded in the bitstream or signal. The following provides a non-limiting example of an embodiment of syntax. It considers that the three components are refined. In variants, syntax for only some of the components (for instance, only for the two chroma components) may be coded and applied. The refinement data are encoded in the form of a refinement table.

```
refinement_data( ) {
  refinement_table_new_flag
  if( refinement_table_new_flag ) {
    refinement_table_flag_luma
    if( refinement_table_flag_luma ) {
      refinement_table_luma_size
      for( i = 0; i < refinement_table_luma_size; i++ ) {
        refinement_luma_idx[ i ]
        refinement_luma_value[ i ]
      }
    }
    refinement_table_flag_cb
    if( refinement_table_flag_cb ) {
      refinement_table_cb_size
      for( i = 0; i < refinement_table_cb_size; i++ ) {
        refinement_cb_idx[ i ]
        refinement_cb_value[ i ]
      }
    }
    refinement_table_flag_cr
    if( refinement_table_flag_cr ) {
      refinement_table_cr_size
      for( i = 0; i < refinement_table_cr_size; i++ ) {
        refinement_cr_idx[ i ]
        refinement_cr_value[ i ]
      }
    }
  }
}
```

If refinement_table_new_flag is equal to 0, or refinement_table_flag_luma is equal to 0, no refinement applies for luma.

Otherwise, for all pt from 0 to (refinement_table_luma_size−1), the luma refinement values (R_idx[pt], R_val[pt]) are computed as follows:

R_idx[pt] is set equal to (default_idx[pt]+−refinement_luma_idx[pt])

R_val[pt] is set equal to (NeutralVal+refinement_luma_value[pt])

A similar process applies for cb or cr component.

For example, NeutralVal=128. It may be used to initialize the values R_val in the step S130 as detailed in FIGS. 21 and 24. NeutralVal and default_idx[pt] may be default values known on both encoder and decoder sides in which case they do not need to be transmitted. In a variant, NeutralVal and default_idx[pt] may be values encoded in the bitstream or signal.

Preferably, default_idx[pt], for pt from 0 to (refinement_table_luma_size−1), is defined as:

default_idx[*pt*]=(MaxVal/(refinement_table_luma_size−1))*\*pt* or default_idx[*pt*]=((MaxVal+1)/(refinement_table_luma_size−1))*\*pt* which corresponds to equi-distant indexes from 0 to MaxVal or (Max+1), MaxVal being the maximum value of the signal (for instance 1023 when the signal is represented with 10 bits).

In a variant, when mapping applies and is based on a PWL mapping table defined by couples (map_idx[k], map_val [k]), R_idx[k], for k=0 to N−1, is initialized by map_idx[k]. In other words, default_idx[k] is equal to map_idx[k]. Similarly, R_val[k], for k=0 to N−1, can be in another variant initialized by map_val[k], for k=0 to N−1.

Syntax elements refinement_table_luma_size, refinement_table_cb_size, refinement_table_cr_size can be defined by default, in which case they do not need to be coded in the stream.

In case of equi-distant points of the luma PWL model, refinement_luma_idx[pt] does not need to be coded. refinement_luma_idx[pt] is set to 0, such that R_idx[pt]=default_idx[pt] for pt from 0 to (refinement_table_luma_size−1). The same applies to cb or cr tables.

In a variant, a syntax element can be added per table to indicate which refinement mode is used (between intra-component (mode 1) and or inter-component (mode 2)). The syntax element can be signaled at the SPS, PPS, slice, tile or CTU level.

In a variant, a syntax element can be added per table to indicate if the table is applied as a multiplicative operator or as an additive operator. The syntax element can be signaled at the SPS, PPS, slice, tile or CTU level.

In an embodiment, the refinement tables are not coded in the bitstream or signal. Instead, the default inverse mapping tables (corresponding to the inverse of the mapping tables used by the mapping 105 on FIGS. 18 and 19) are modified by the refinement tables, and the modified inverse mapping tables are coded in the bitstream or signal.

In an embodiment, the refinement tables are only coded for pictures of low temporal levels. For instance, the tables are coded only for pictures of temporal level 0 (lowest level in the temporal coding hierarchy).

In an embodiment, the refinement tables are only coded for random access pictures, such as intra pictures.

In an embodiment, the refinement tables are only coded for pictures of high quality, corresponding to an average QP over the picture below a given value.

In an embodiment, a refinement table is coded only if the refinement table coding cost relatively to the full picture coding cost is below a given value.

In an embodiment, a refinement table is coded only if the rate-distortion gain compared to not coding the refinement table is above a given value. For instance, the following rules may apply:

if the rate-distortion cost gain is larger than (0.01\*width\*height), where width and height are the dimensions of the considered component, then the table is coded.

if the rate-distortion cost gain is larger than (0.0025*initRD), where initRD is the rate-distortion cost when the refinement of the component does not apply, then the table is coded. This approximately corresponds to a minimum PSNR gain of 0.01 dB when rate-distortion cost is based on the square error distortion. If the given value is set to (0.01*initRD), this approximately corresponds to a minimum PSNR gain of 0.05 dB when rate-distortion cost is based on the square error distortion. The described values are only examples and can be modified.

Back to FIG. 20, at an optional step S150, the refinement data are applied on the reconstructed picture part possibly filtered as in FIG. 19.

To this aim, a look-up-table LutR is determined from the couples of points of the PWL (R_idx[pt], R_val[pt]) for pt=0 to N−1.

For example LutR is determined by linear interpolation between each couple of points of the PWL (R_idx[pt], R_val[pt]) and (R_idx[pt+1], R_val[pt+1]), as follows:
For pt=0 to N−2
  For idx=R_idx[pt] to (R_idx[pt+1]−1)

$$LutR[idx]=R\_val[pt]+(R\_val[pt+1]-R\_val[pt])*(idx-R\_idx[pt])/(R\_idx[pt+1]-R\_idx[pt])$$

In a variant, LutR is determined as follows:
For pt=0 to N−2
  For idx=R_idx[pt] to (R_idx[pt+1]−1)

$$LutR[idx]=(R\_val[pt]+R\_val[pt+1])/2$$

Two examples of refinement modes are as follows:
  Mode 1—intra-component refinement. In mode 1, the refinement is performed independently of other components. The signal Srec(p) is refined as follows:

$$Sout(p)=LutR[Srec(p)]/NeutralVal*Srec(p)$$

where Srec(p) is the reconstructed signal to be refined at location p in the picture part and corresponds to the signal coming from the in-loop filter(s) or possibly coming from the inverse mapping and Sout(p) is the refined signal. It is considered here that the signals Srec and Sout use the same bit depth. When using different bit depths for both signals (namely Bout for Sout and Brec for Srec), a scaling factor related to the bit depth difference may be applied. For instance, the formula is adapted as follows when the bit depth Bout of Sout is higher than the bit depth Brec of Srec:

$$Sout(p)=2^{(Bout-Brec)}*LutR[Srec(p)]/NeutralVal*Srec(p)$$

The scaling factor can be directly integrated in LutR values. For example, the formula is adapted as follows when the bit depth Bout of Sout is lower than the bit depth Brec of Srec:

$$Sout(p)=LutR[Srec(p)]/NeutralVal*Srec(p)/2^{(Brec-Bout)}$$

The scaling factor can be directly integrated in LutR values. Advantageously, mode 1 is used for the luma component.

Mode 2—inter-component refinement. In mode 2, the refinement is performed for one component C0 and depends on another component C1. The signal Srec_C0(p) is refined as follows:

$$Sout(p)=\text{offset}+LutR[Srec\_C1(p)]/NeutralVal*(Srec\_C0(p)-\text{offset})$$

where offset is for example set to (MaxVal/2), Srec_C0(p) is the reconstructed signal of the component C0 to be refined, p is the sample location in the picture part. MaxVal is the max value of the signal Srec_C0 and is computed as $(2^B-1)$, where B is the bit depth of the signal. Srec_C1(p) is the reconstructed signal of the component C1. Srec_C1(p) can be the signal coming from the in-loop filters, or from the inverse mapping. Srec_C1(p) may also be further filtered, e.g. with a low pass filter, after having been filtered by the in-loop filter(s). It is considered here that the signals Srec_C0, Srec_C1 and Sout use the same bit depth. Advantageously, the mode 2 can be applied to chroma components and depends on a luma component. The formula is adapted as follows when the bit depth Bout of Sout is higher than the bit depth Brec of Srec_C0 and Srec_C1:

$$Sout(p)=2^{(Bout-Brec)}*(\text{offset}+LutR[Srec\_C1(p)]/NeutralVal*(Srec\_C0(p)-\text{offset}))$$

The formula is adapted as follows when the bit depth Bout of Sout is lower than the bit depth Brec of Srec_C0 and Srec_C1:

$$Sout(p)=(\text{offset}+LutR[Srec\_C1(p)]/NeutralVal*(Srec\_C0(p)-\text{offset}))/2^{(Bout-Brec)}$$

Rounding and clipping between the minimum and maximum signal values (typically 0 and 1023 for a 10-bits signal) are finally applied to the refined values Sout(p).

In the above embodiment, the refinement applies as a multiplicative operator. In a variant, the refinement applies as an additive operator. In this case, in mode 1, the signal Srec(p) is refined as follows:

$$Sout(p)=LutR[Srec(p)]/NeutralVal+Srec(p)$$

In this case, in mode 2, the signal Srec_C0(p) is refined as follows:

$$Sout(p)=LutR[Srec\_C1(p)]/NeutralVal+Srec\_C0(p)$$

An example of cross-component refinement table values are shown below, for NeutralVal=64, and N=17, for the chroma components Cb and Cr:

| Cb | | | | | | | | | | | | | | | | | |
|---|---|---|---|---|---|---|---|---|---|---|---|---|---|---|---|---|---|
| k | 0 | 1 | 2 | 3 | 4 | 5 | 6 | 7 | 8 | 9 | 10 | 11 | 12 | 13 | 14 | 15 | 16 |
| R_idx[k] | 0 | 64 | 128 | 192 | 256 | 320 | 384 | 448 | 512 | 576 | 640 | 702 | 766 | 830 | 896 | 960 | 1024 |
| R_val[k] | 64 | 64 | 64 | 52 | 58 | 63 | 66 | 65 | 62 | 66 | 66 | 64 | 72 | 49 | 64 | 64 | 64 |

| Cr | | | | | | | | | | | | | | | | | |
|---|---|---|---|---|---|---|---|---|---|---|---|---|---|---|---|---|---|
| K | 0 | 1 | 2 | 3 | 4 | 5 | 6 | 7 | 8 | 9 | 10 | 11 | 12 | 13 | 14 | 15 | 16 |
| R_idx[k] | 0 | 64 | 128 | 192 | 256 | 320 | 384 | 448 | 512 | 576 | 640 | 702 | 766 | 830 | 896 | 960 | 1024 |
| R_val[k] | 64 | 64 | 62 | 61 | 63 | 66 | 65 | 66 | 64 | 60 | 70 | 64 | 64 | 41 | 64 | 64 | 64 |

Returning to FIG. 20, the method ends at step S160.

Figure 21:
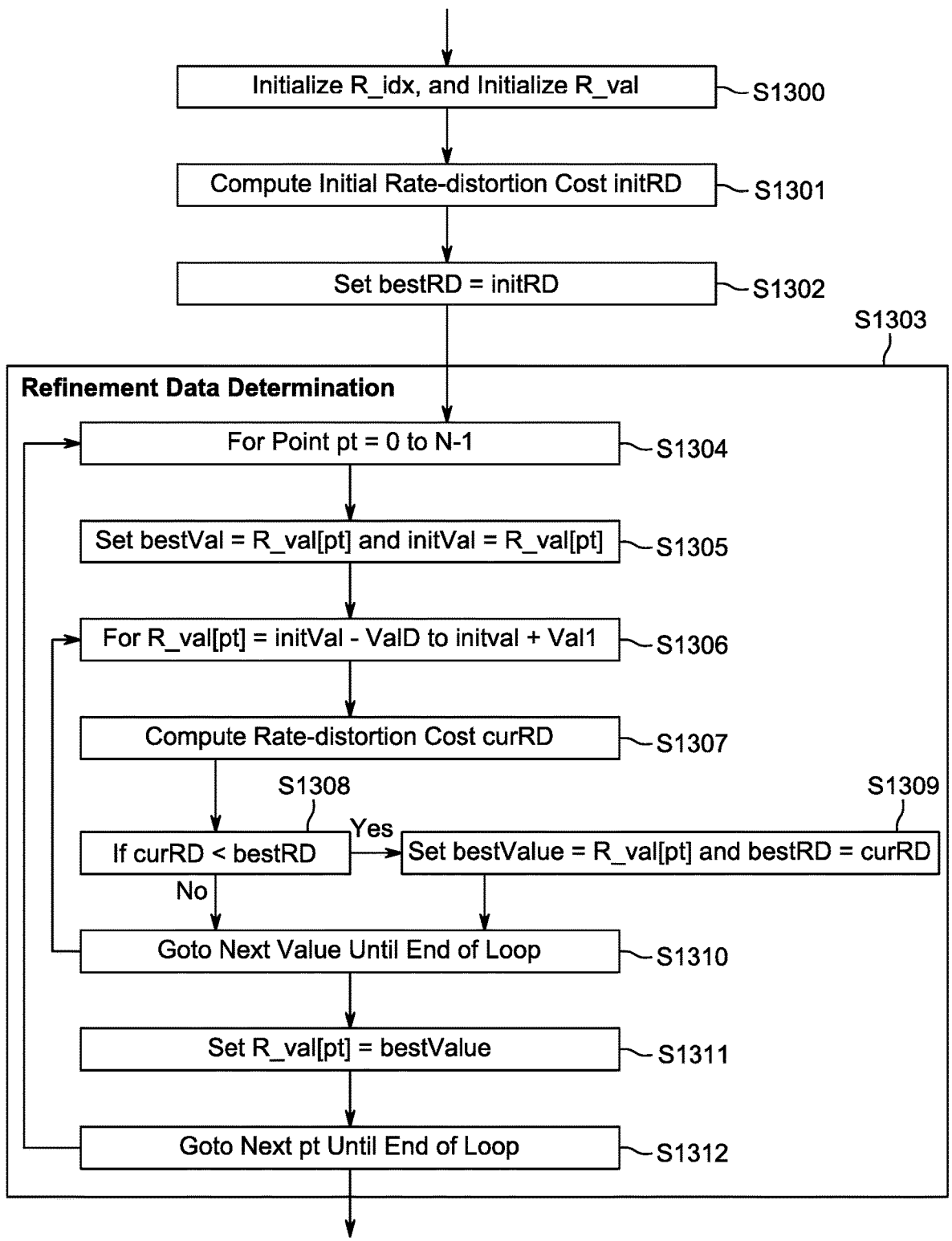
FIG. 21 provides a flow diagram depicting an example of an embodiment of features of at least one other embodiment such as the process depicted in FIG. 20.
Figure 22:
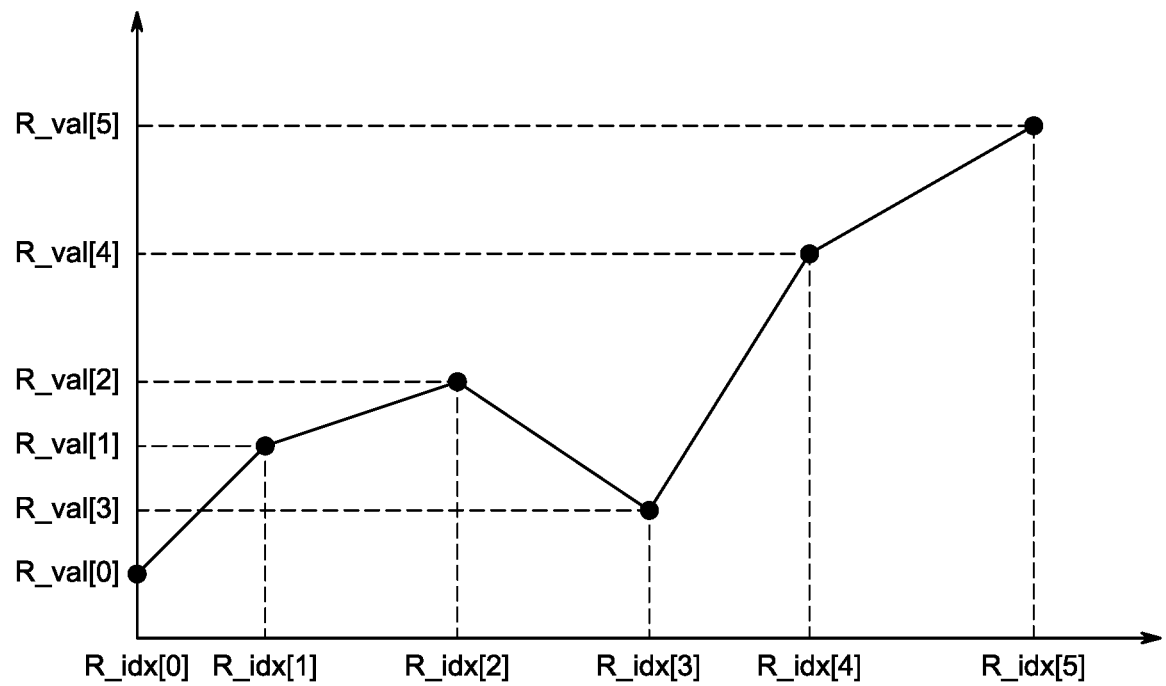
FIG. 22 provides a graph illustrating features of an embodiment of a refinement table.

FIG. 21 shows a flowchart illustrating an example of more detail for step S130. The refinement data may be determined over a given picture area A, e.g. a slice, a tile or a CTU, or over the entire picture. The refinement data R can be advantageously modeled by a piece-wise linear model (PWL), defined by N couples (R_idx[k], R_val[k]), k=0 to N−1. An example of PWL model is illustrated in the FIG. 22 where N=6 (k c {0, 1, 2, 3, 5}). Each couple defines a pivot point of the PWL model.

The values R_idx and R_val are initialized (step S1300). Typically, R_idx[k] are initialized, for k=0 to N−1, such that there is an equidistant space between successive indexes, that is, (R_idx[k+1]−R_idx[k])=D, where D=Range/(N−1), Range being the range of the signal to refine (e.g. 1024 for a signal represented on 10 bits). In an example, N=17 or 33. The values R_val are initialized with values NeutralVal which are defined such that the refinement does not change the signal, e.g. 128. In a variant, when mapping applies and is based on a PWL mapping table defined by couples (map_idx[k], map_val[k]), (R_idx[k], R_val[k]), for k=0 to N−1, is initialized by (map_idx[k], map_val[k]).

In the embodiment of FIG. 21 only the values R_val[k] are determined. The values R_idx[k] are fixed to their initial values. The initial rate-distortion cost, initRD, is computed (step 1301) using R as initialized in S1300. The initial rate-distortion cost initRD is computed as follows:

$$initRD = L*Cost(R) + \Sigma_{p\ in\ A} dist(Sin(p), Sout(p)) \quad (eq.1)$$

where:
R is the refinement data as initialized in S1300,
A is the picture area for which the refinement is performed;
Sin(p) is defined as follows:
When no mapping applies, Sin(p) is the sample value of a pixel p in the original picture area;
When mapping applies and refinement is out of the loop (FIG. 18), Sin(p) is the sample value of a pixel p in the original picture area;
When mapping applies and refinement is in the loop (FIG. 19), Sin(p) is the sample value of a pixel p in the mapped original picture area;
Sout(p) is the sample value of the pixel p in the refined picture area;
dist(x,y) is the distortion between a sample value x and a sample value y, e.g. the distortion is the square error $(x-y)^2$; other possible distortion functions are the absolute difference |x−y|, or distortion based on subjective-oriented metrics such as the SSIM (Z. Wang, A. C. Bovik, H. R. Sheikh and E. P. Simoncelli, "Image quality assessment: From error visibility to structural similarity," WEE Transactions on Image Processing, vol. 13, no. 4, pp. 600-612, April 2004) or variants of SSIM can also be used;
Cost(R) is the coding cost for coding the refinement data R and the refined picture area; and
L is a value associated with the picture area A. It is advantageously linearly dependent on $2^{(QP/6)}$ where QP is the quantization parameter when a single quantization parameter value is used inside the picture area A, or QP is representative of the quantization parameters applied to the picture area A when different quantization parameter values are used inside the picture area A. For instance, QP is the average of the QPs used inside the blocks of the area A.

In the case where, values R_val are initialized with values NeutralVal, the initial rate-distortion cost initRD may be computed with coding cost of the picture area without coding cost of refinement data.

A parameter bestRD is initialized to initRD at step S1302. The refinement data R are then determined at step S1303. A loop over the index pt of the successive pivot points of the PWL model R is performed at step S1304. At step S1305, parameters bestVal and initVal are initialized to R_val[pt]. A loop over various values of R_val[pt], namely from a value (initVal−Val0) to a value (initVal+Val1) is performed at step S1306, where Val0 and Val1 are predefined parameters. Typical values Val0=Val1=NeutralVal/4. The rate-distortion cost, curRD, is computed at step S1307 using equation 1 with the current R (with the current R_val[pt]). curRD and bestRD are compared at step S1308. If curRD is lower than bestRD, bestRD is set to curRD and bestValue is set to R_val[pt]. Otherwise the method continues at step S1310. At step S1310, it is checked whether the loop over the values of R_val[pt] ends. In the case where the loop ends, R_val[pt] is set to bestValue at step S1311. At step S1312, it is checked whether the loop over the values of pt ends. In the case where the loop ends, current R is the output refinement data.

Figure 23:
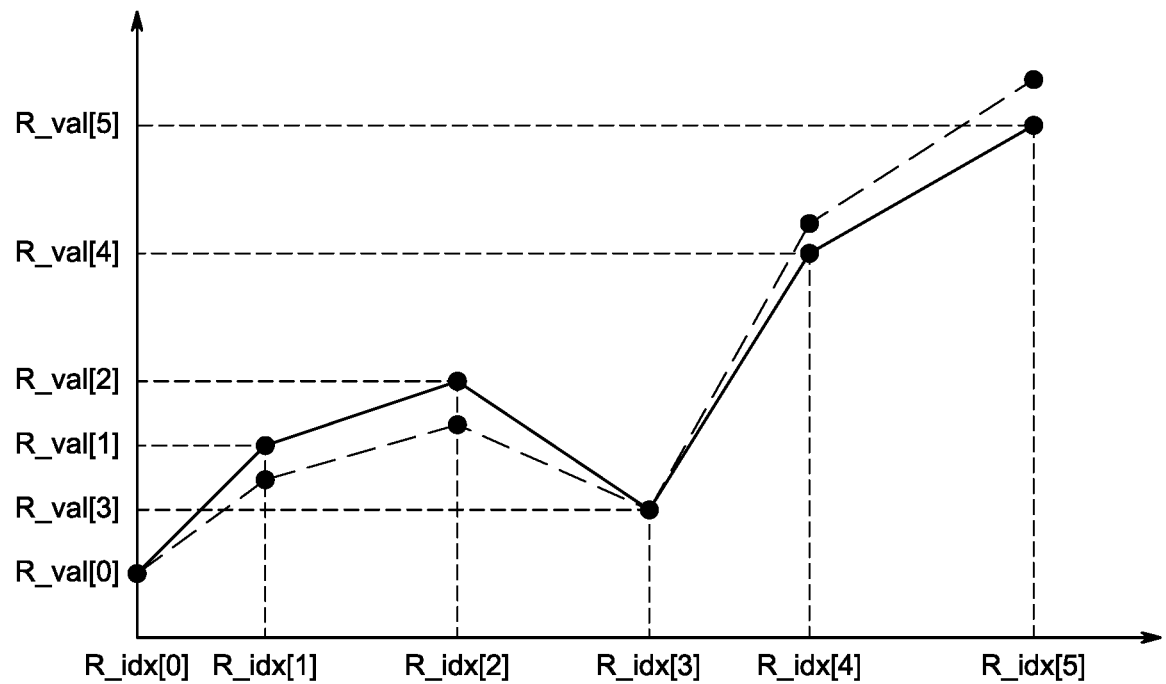
FIG. 23 provides a graph illustrating features of another embodiment of a refinement table.

The step S1303 may be iterated n times, n being an integer whose value is fixed, e.g. n=3. FIG. 23 illustrates the determination of R_val. The dashed line represents the PWL after updating R_val.

Figure 24:
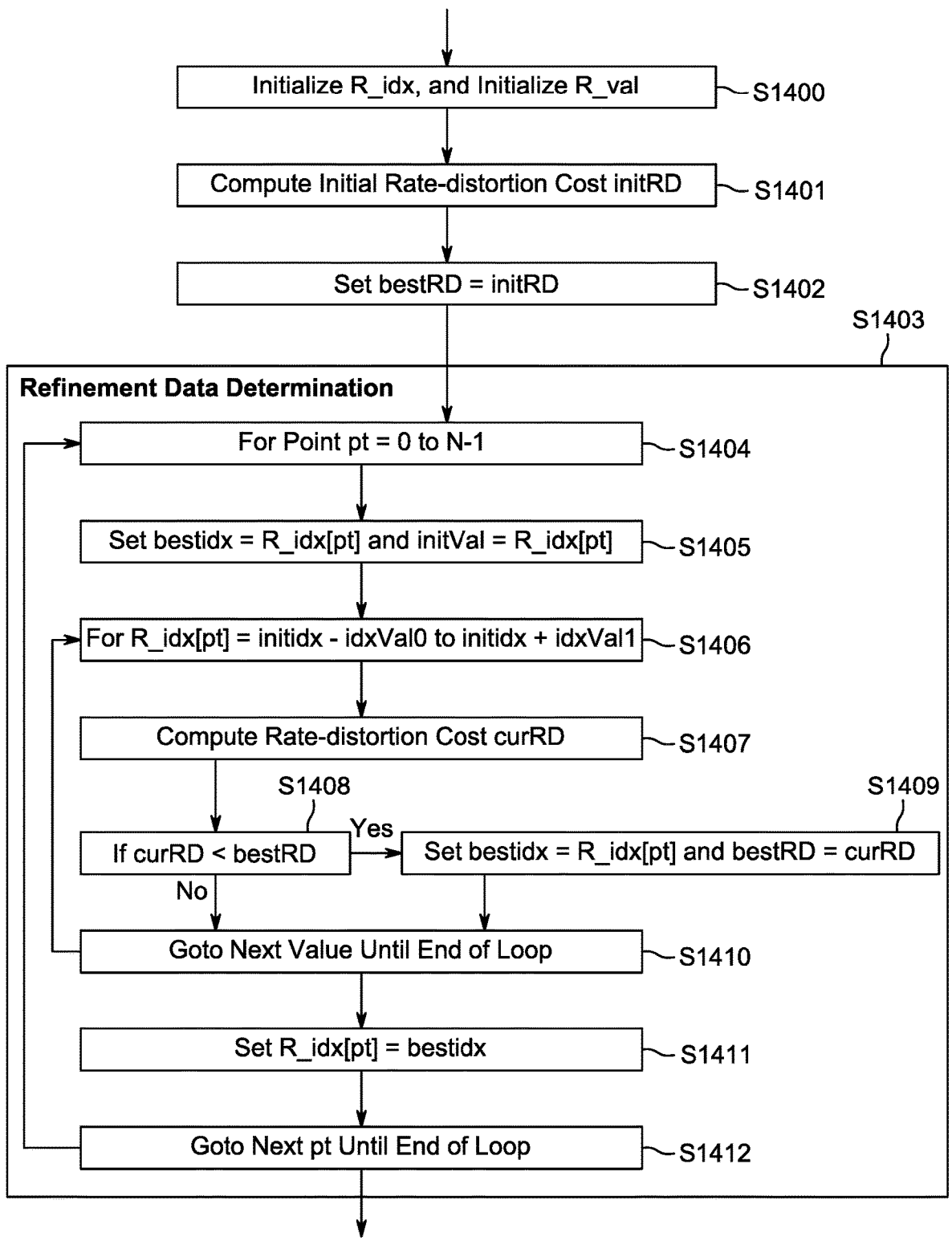
FIG. 24 provides a flow diagram depicting an example of an embodiment of a variant of the process depicted in FIG. 21

FIG. 24 represents a variant of the process of FIG. 21. In the embodiment of FIG. 24 only the values R_idx[k] are determined. The values R_val[k] are fixed to their initial values. The process uses as input initial R_idx and R_val data (for instance coming from the method of FIG. 21). The initial rate-distortion cost, initRD, is computed at step S1401 using (eq. 1). A parameter bestRD is initialized to initRD at step S1402. The refinement data R are then determined at step S1403. A loop over the index pt of the successive pivot points of the PWL model R is performed at step S1404. At step S1405, parameters bestIdx and initIdx are initialized to R_idx[pt]. A loop over various values (from initIdx−idxVal0 to initIdx+idxVal1) of R_idx[pt] is performed at step S1406, where idxVal0 and idxVal1 are defined values, e.g. idxVal0=idxVal1=D/4 where D=Range/(N−1), Range being the range of the signal to refine (e.g. 1024 for a signal represented on 10 bits). The rate-distortion cost, curRD, is computed at step S1407 using equation 1 with the current R (with the current R_idx[pt]). curRD and bestRD are compared at step S1408. If curRD is lower than bestRD, bestRD is set to curRD and bestIdx is set to R_idx[pt]. Otherwise the method continues at step S1310. At step S1410, it is checked whether the loop over the values of R_idx[pt] ends. In the case where the loop ends, R_idx[pt] is set to bestIdx at step S1411. At step S1412, it is checked whether the loop over the values of pt ends. In the case where the loop ends, current R is the output refinement data. The step S1403 may be iterated n times, n being an integer whose value is fixed, e.g. n=3.

Figure 25:
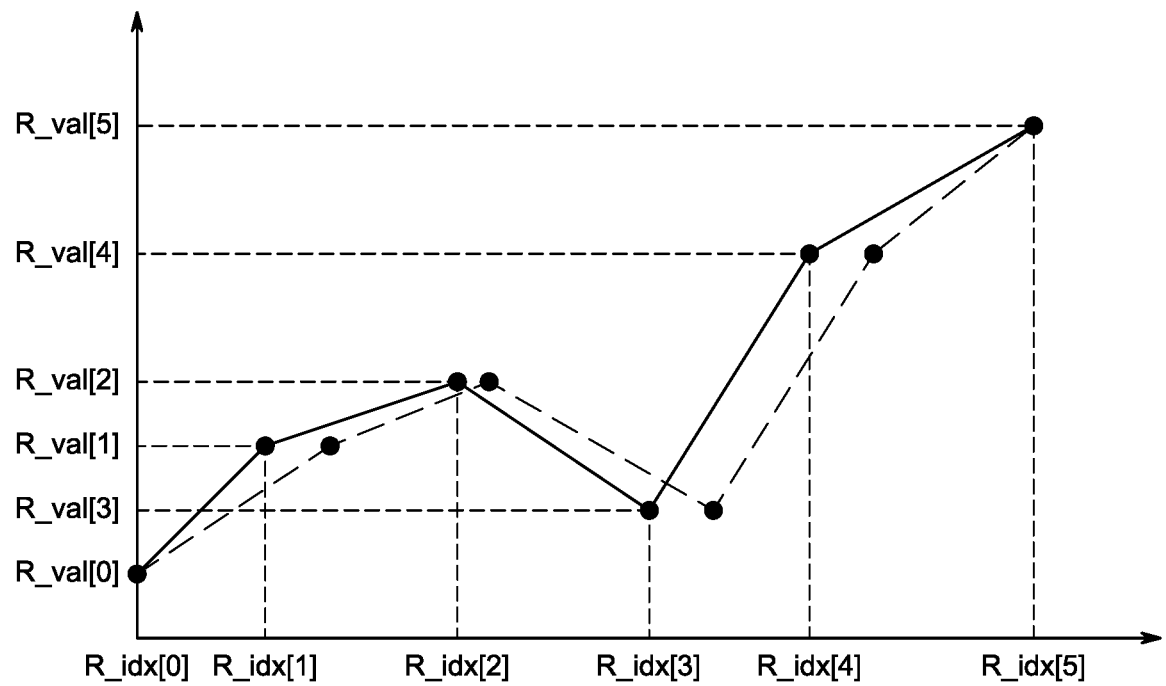
FIG. 25 provides a graph depicting features of another embodiment of a refinement table.

FIG. 25 illustrates the determination of R_idx. The dashed line represents the PWL after updating R_idx.

Figure 26:
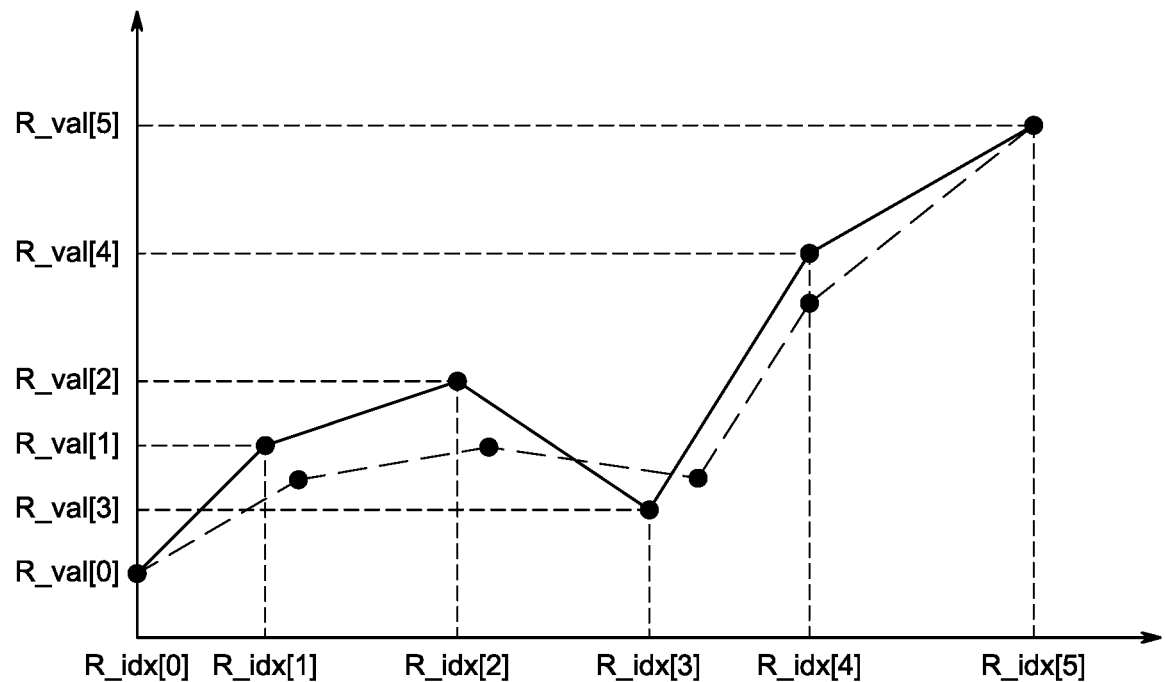
FIG. 26 provides a graph depicting features of another embodiment of a refinement table.

FIG. 26 illustrates the determination of both R_idx and R_val. The dashed line represents the PWL after updating of R_val and R_idx.

Figure 27:
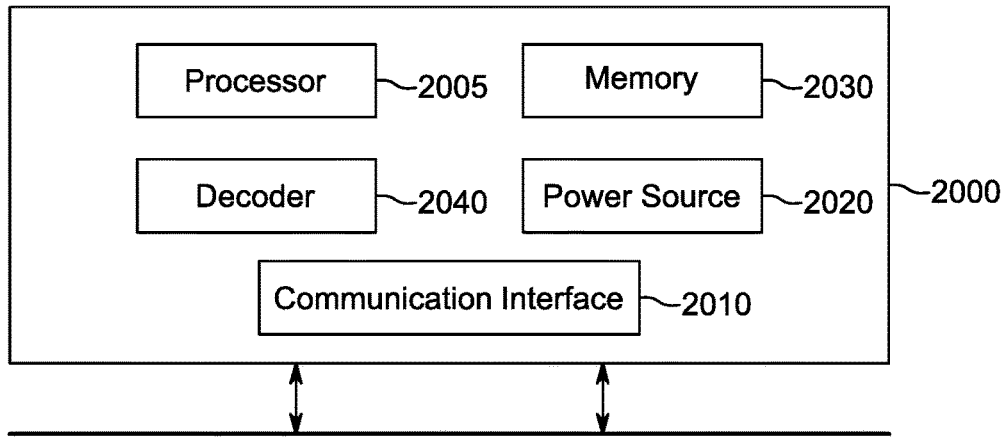
FIG. 27 provides a block diagram depicting an example of an embodiment of a system such as a receiver including video decoding.

FIG. 27 represents an example of an architecture of a receiver 2000 configured to decode a picture from a bitstream or signal to obtain a decoded picture according to a specific and non-limiting embodiment. The receiver 2000 comprises one or more processor(s) 2005, which could comprise, for example, a CPU, a GPU and/or a DSP (English acronym of Digital Signal Processor), along with internal memory 2030 (e.g. RAM, ROM and/or EPROM). The receiver 2000 comprises one or more communication interface(s) 2010 (e.g. a keyboard, a mouse, a touchpad, a webcam), each adapted to display output information and/or allow a user to enter commands and/or data (e.g. the decoded picture); and a power source 2020 which may be external to the receiver 2000. The receiver 2000 may also comprise one or more network interface(s) (not shown). The decoder module 2040 represents the module that may be included in a device to perform the decoding functions. Additionally, the decoder module 2040 may be implemented as a separate element of the receiver 2000 or may be incorporated within processor(s) 2005 as a combination of hardware and software as known to those skilled in the art.

The bitstream or signal may be obtained from a source. According to different embodiments, the source can be, but is not limited to:
- a local memory, e.g. a video memory, a RAM, a flash memory, a hard disk;
- a storage interface, e.g. an interface with a mass storage, a ROM, an optical disc or a magnetic support;
- a communication interface, e.g. a wireline interface (for example a bus interface, a wide area network interface, a local area network interface) or a wireless interface (such as a IEEE 802.11 interface or a Bluetooth interface); and
- an image capturing circuit (e.g. a sensor such as, for example, a CCD (or Charge-Coupled Device) or CMOS (or Complementary Metal-Oxide-Semiconductor)).

According to different embodiments, the decoded picture may be sent to a destination, e.g. a display device. As an example, the decoded picture is stored in a remote or in a local memory, e.g. a video memory or a RAM, a hard disk. In a variant, the decoded picture is sent to a storage interface, e.g. an interface with a mass storage, a ROM, a flash memory, an optical disc or a magnetic support and/or transmitted over a communication interface, e.g. an interface to a point to point link, a communication bus, a point to multipoint link or a broadcast network.

According to a specific and non-limiting embodiment, the receiver 2000 further comprises a computer program stored in the memory 2030. The computer program comprises instructions which, when executed by the receiver 2000, in particular by the processor 2005, enable the receiver to execute the decoding method described with reference to FIG. 31. According to a variant, the computer program is stored externally to the receiver 2000 on a non-transitory digital data support, e.g. on an external storage medium such as a HDD, CD-ROM, DVD, a read-only and/or DVD drive and/or a DVD Read/Write drive, all known in the art. The receiver 2000 thus comprises a mechanism to read the computer program. Further, the receiver 2000 could access one or more Universal Serial Bus (USB)-type storage devices (e.g., "memory sticks.") through corresponding USB ports (not shown).

According to one or more non-limiting examples of embodiments, the receiver 2000 can be, but is not limited to:
- a mobile device;
- a communication device;
- a game device;
- a set top box;
- a TV set;
- a tablet (or tablet computer);
- a laptop;
- a video player, e.g. a Blu-ray player, a DVD player;
- a display; and
- a decoding chip or decoding device/apparatus.

Figure 28:
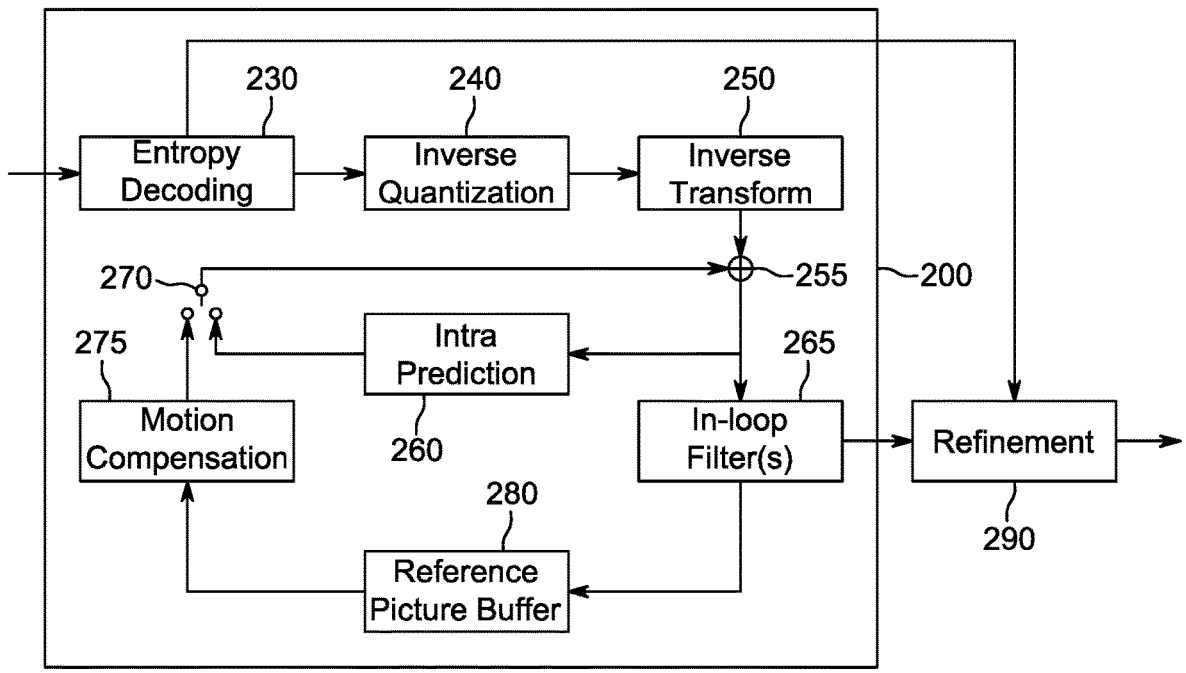
FIG. 28 provides a block diagram depicting another example of an embodiment of a video decoder.
Figure 31:
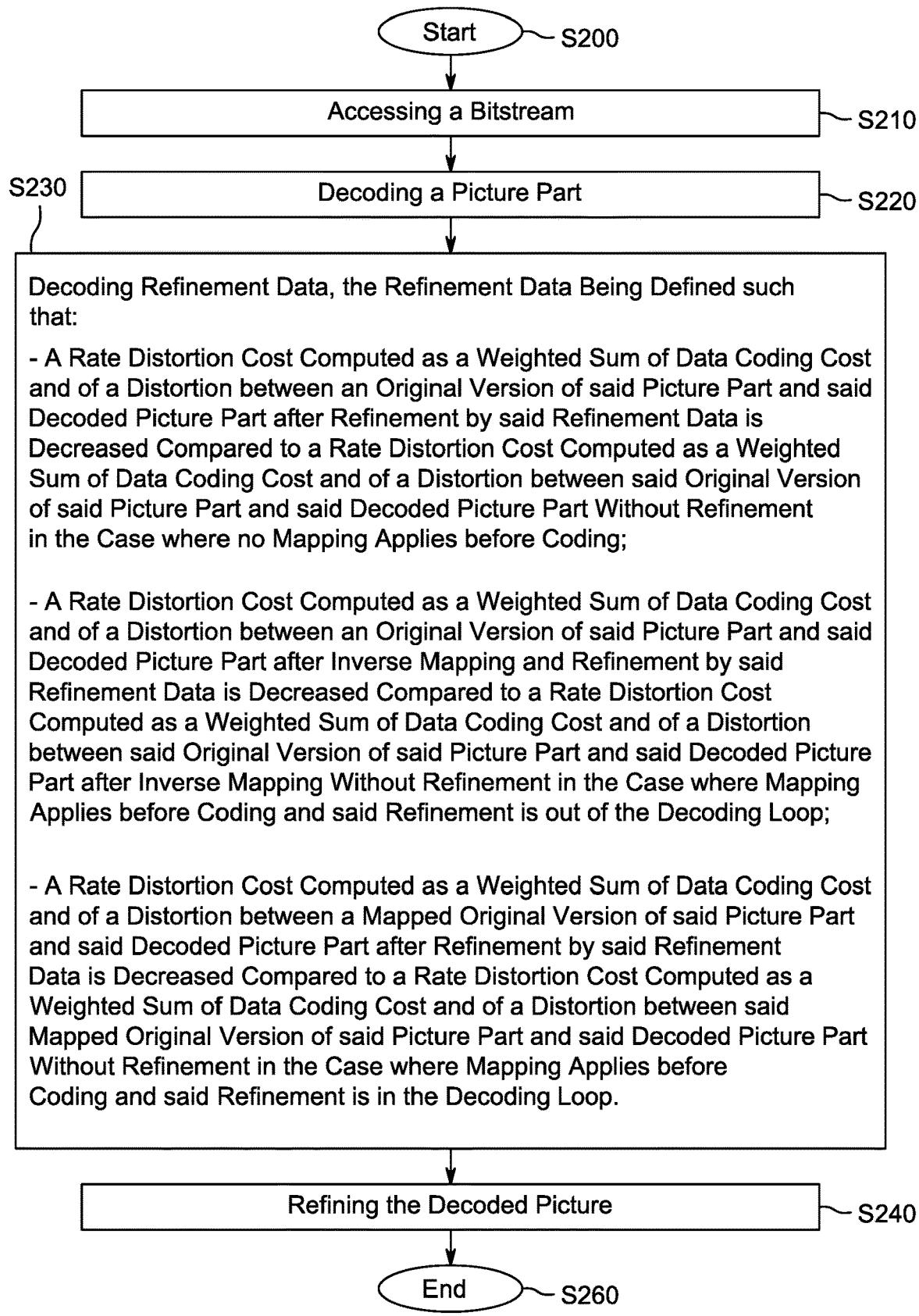
FIG. 31 provides a flow diagram depicting an example of an embodiment of a process for decoding a video signal.

FIG. 28 illustrates a block diagram of an example of an embodiment of a video decoder 200, e.g. of the HEVC type, adapted to execute the decoding method of FIG. 31. The video decoder 200 is an example of a receiver 2000 or part of such a receiver 2000. In the illustrated example of an embodiment of decoder 200, a bitstream or signal is decoded by the decoder elements as described below. Video decoder 200 generally performs a decoding pass reciprocal to the encoding pass as described in FIG. 17, which performs video decoding as part of encoding video data.

In particular, the input of the decoder includes a video bitstream or signal, which may be generated by the video encoder 100. The bitstream or signal is first entropy decoded (230) to obtain transform coefficients, motion vectors, and other coded information, e.g. refinement data. The transform coefficients are de-quantized (240) and inverse transformed (250) to decode residuals. The decoded residuals are then combined (255) with a predicted block (also known as a predictor) to obtain a decoded/reconstructed picture block. The predicted block may be obtained (270) from intra prediction (260) or motion-compensated prediction (i.e., inter prediction) (275). As described above, AMVP and merge mode techniques may be used during motion compensation, which may use interpolation filters to calculate interpolated values for sub-integer samples of a reference block. An in-loop filter (265) is applied to the reconstructed picture. The in-loop filter may comprise a deblocking filter and a SAO filter. The filtered picture is stored at a reference picture buffer (280). The reconstructed picture possibly filtered is refined (290). Refinement is out of the decoding loop and is applied as a post-processing process.

Figure 29:
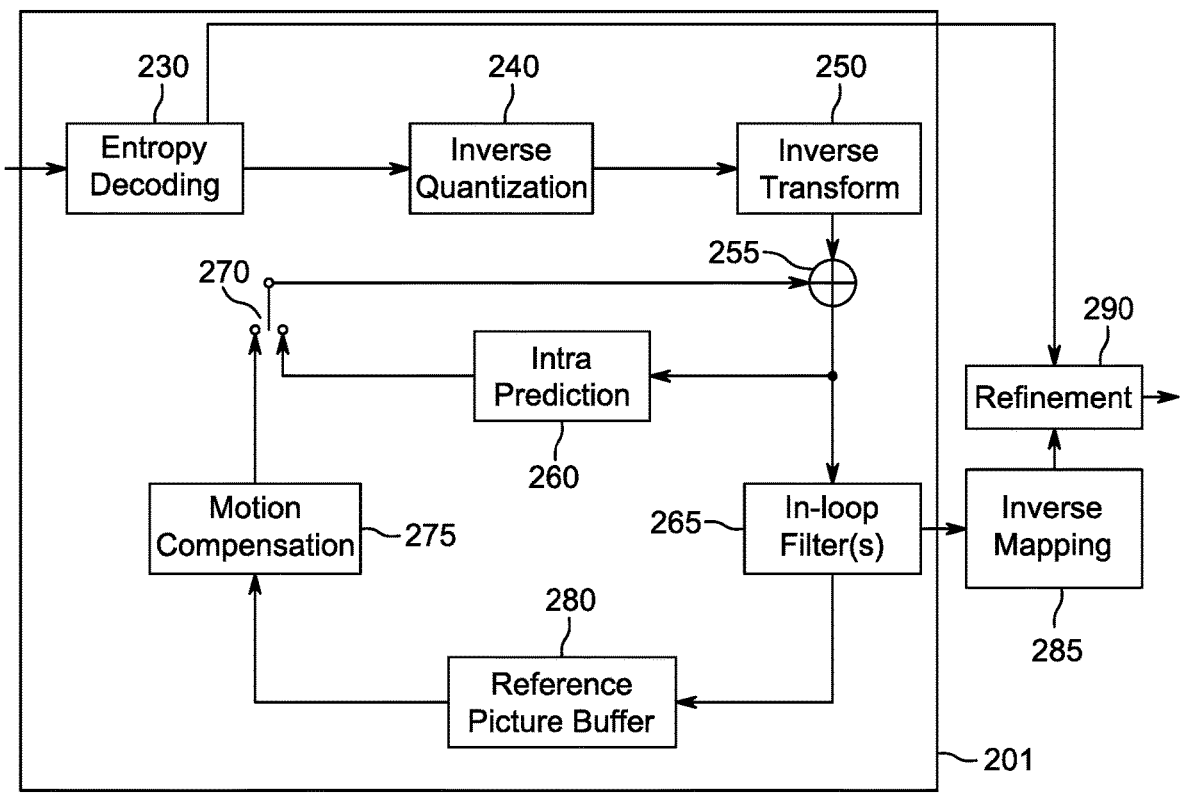
FIG. 29 provides a block diagram depicting another example of an embodiment of a video decoder.

FIG. 29 illustrates a variant 201 of the video decoder 200 of FIG. 28. The modules of FIG. 29 identical to the modules of FIG. 28 are labelled with the same numerical references and are not further described. The filtered reconstructed picture, i.e. the output of the in-loop filter(s), is inverse mapped (285). The inverse mapping (285) is the inverse process of the mapping (105) applied on the encoder side. The inverse mapping may use inverse mapping tables decoded from the bitstream or signal or default inverse mapping tables. The inverse mapped picture is refined (290) using refinement data decoded (230) from the bitstream or signal.

In a variant, the inverse mapping and refinement are merged in a single module that applies inverse mapping using inverse mapping tables decoded from the bitstream or signal wherein the inverse mapping tables are modified in the encoder to take into account the refinement data. In a variant, for a given component being processed, a look-up-table LutComb is applied to perform the inverse mapping and refinement processes, and this look-up-table is built as the concatenation of the look-up-table LutInvMap derived from the mapping table, and of the look-up table derived from the refinement table LutR:

LutComb[x]=LutR[LutInvMap [x]], for x=0 to MaxVal

In this embodiment, the refinement process is out of the decoding loop. Therefore, the refinement process is only applied in the decoder as a post-processing.

Figure 30:
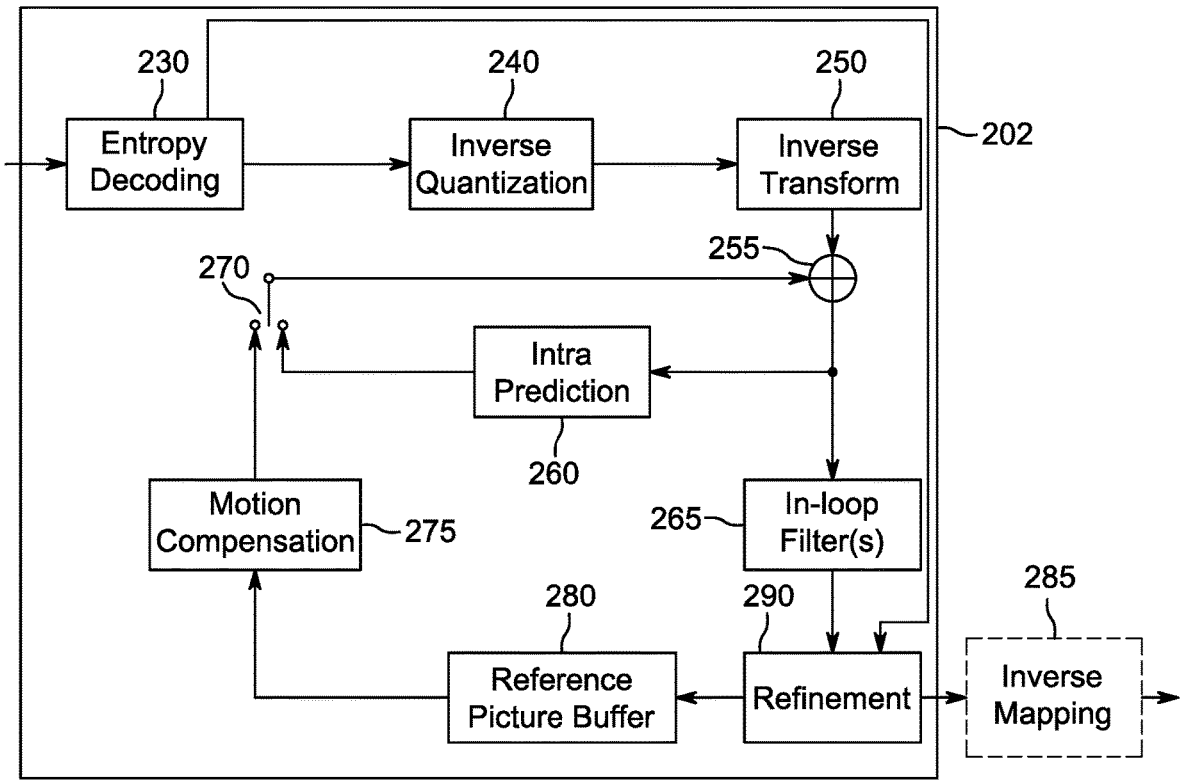
FIG. 30 provides a block diagram depicting another example of an embodiment of a video decoder.

FIG. 30 illustrates a variant 202 of the video decoder 200 of FIG. 28. The modules of FIG. 30 identical to the modules of FIG. 28 are labelled with the same numerical references and are not further described. Refinement data are decoded from the bitstream or signal (230). The filtered reconstructed picture is refined (290) using the decoded refinement data. The refined picture is stored in the reference picture buffer (280) instead of the filtered reconstructed picture. The module 290 may be inserted in different locations. The module 290 of refinement may be inserted before the in-loop filter(s) or in between the in-loop filter(s) in case of at least two in-loop filters, e.g. after the DBF and before the SAO. The refined picture may optionally be inverse mapped (285). In this embodiment, the refinement process is in the decoding loop.

FIG. 31 represents a flowchart of a method for decoding a picture from a bitstream or signal according to a specific and non-limiting embodiment. The method starts at step S200. At step S210, a receiver 2000 such as the decoder 200 accesses a bitstream or signal. At step S220, the receiver decodes a picture part from the bitstream or signal to obtain a decoded picture part. To this aim, the blocks of the picture part are decoded. Decoding a block usually but not necessarily comprises entropy decoding a portion of the bitstream or signal representative of the block to obtain a block of transform coefficients, de-quantizing and inverse transforming the block of transform coefficients to obtain a block of residuals and adding a predictor to the block of residuals to obtain a decoded block. The decoded picture part may then be filtered by in-loop filter(s) as in FIGS. 28-30 and also inverse mapped as in FIG. 29. At step S230, refinement data are decoded from the bitstream or signal. This step is the inverse of the encoding step S140. All variants and embodiments described with respect to step S140 apply to step S230. At step S240, the decoded picture is refined. This step is identical to the refinement step S150 of the encoder side.

Figure 32:
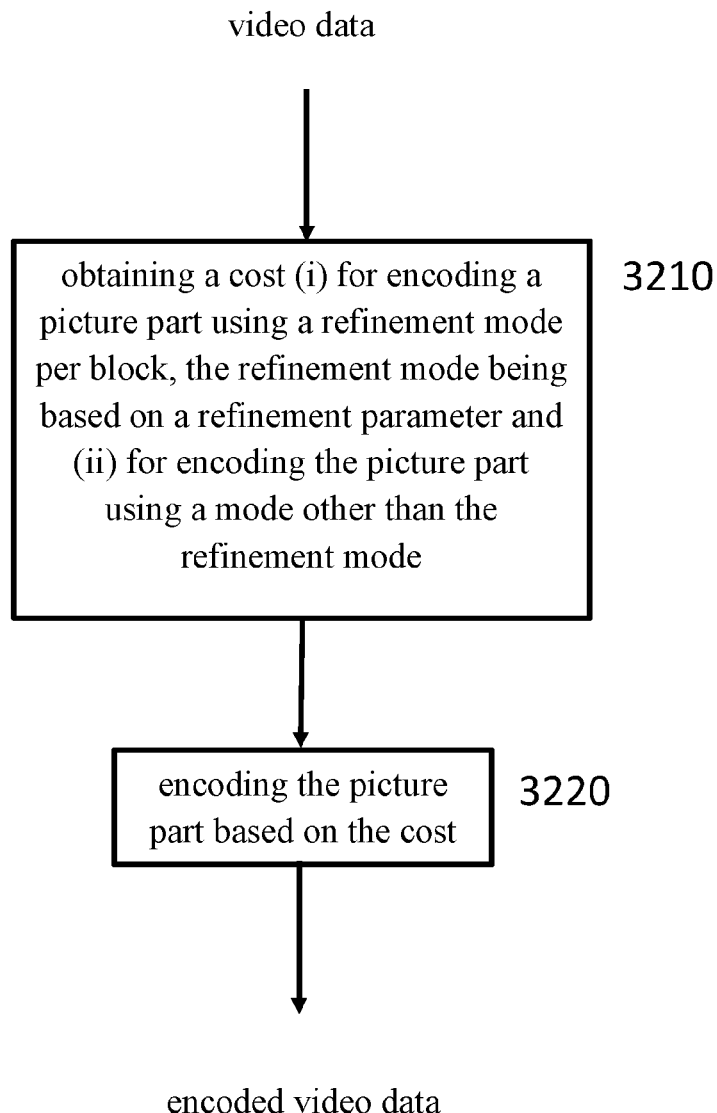
FIG. 32 provides a block diagram depicting another example of an embodiment of a video encoder.

Another example of an embodiment is shown in FIG. 32 which is a method for encoding video data including providing a refinement mode capability. In FIG. 32, video data such as data included in a digital video signal or bitstream is processed at 3210 to identify obtain a cost associated with encoding video data such as a picture part using a refinement mode per block as described herein and using a mode other than a refinement mode, e.g., no refinement. Then, at 3220, the video data is encoded based on the cost. For example, a cost such as a rate distortion cost can be obtained for encoding both with and without a refinement mode. If use of the refinement mode results in a rate distortion cost indicating an improvement of encoding then encoding can occur using the refinement mode. A rate distortion cost indicating no improvement of limited improvement that does not justify adding complexity for the refinement mode can result in no use of the refinement mode or use of a different mode. Processing of the video data to obtain the cost and to encode the video data may occur, e.g., as described above in regard to one or more embodiments described herein. Encoded video data is output from 3220.

Figure 33:
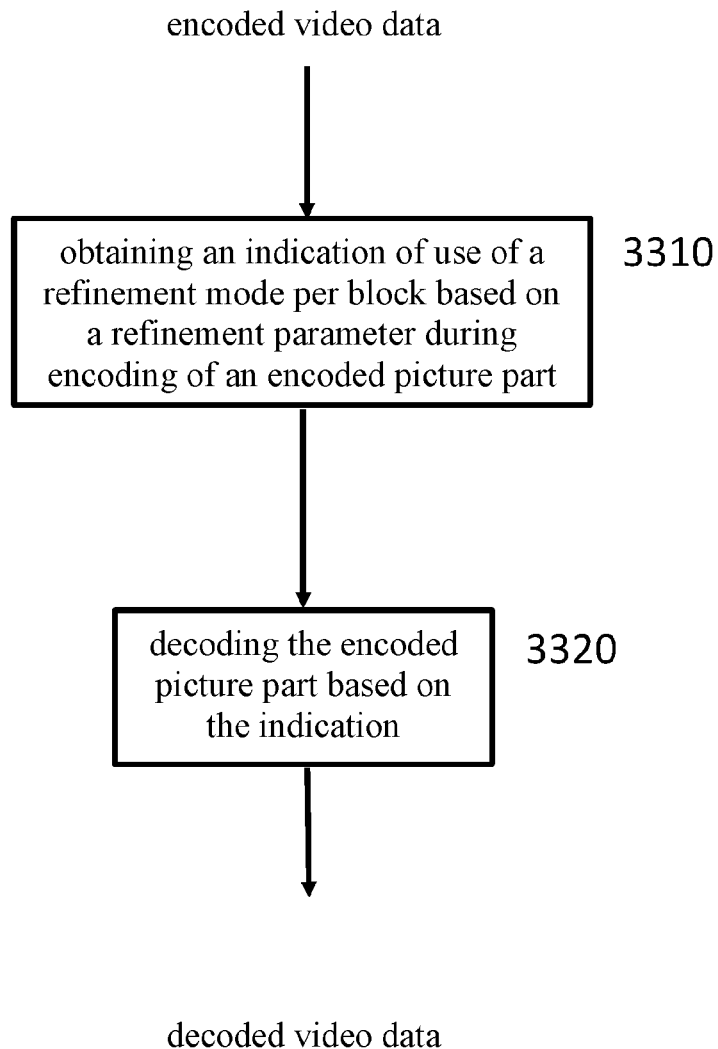
FIG. 33 provides a block diagram depicting another example of an embodiment of a video decoder.

FIG. 33 shows an example of an embodiment of a method for decoding video data. The encoded video data, e.g., digital data signal or bitstream, is processed at 3310 to obtain an indication of use of a refinement mode, e.g., a refinement mode per block, during encoding of the video data in accordance with one or more embodiments described herein. Then, at 3320, encoded video data such as an encoded picture part is decoded based on the indication, e.g., decoding as described herein based on a refinement mode having been used during encoding. Processing of the video data to obtain the cost and to encode the video data may occur, e.g., as described above in regard to one or more embodiments described herein. Decoded video data is output from 3320.

Throughout this disclosure, various implementations involve decoding. "Decoding", as used in this application, can encompass all or part of the processes performed, for example, on a received encoded sequence in order to produce a final output suitable for display. In various embodiments, such processes include one or more of the processes typically performed by a decoder, for example, entropy decoding, inverse quantization, inverse transformation, and differential decoding. In various embodiments, such processes also, or alternatively, include processes performed by a decoder of various implementations described in this application, for example, extracting a picture from a tiled (packed) picture, determining an upsample filter to use and then upsampling a picture, and flipping a picture back to its intended orientation.

As further examples, in one embodiment "decoding" refers only to entropy decoding, in another embodiment "decoding" refers only to differential decoding, and in another embodiment "decoding" refers to a combination of entropy decoding and differential decoding. Whether the phrase "decoding process" is intended to refer specifically to a subset of operations or generally to the broader decoding process will be clear based on the context of the specific descriptions and is believed to be well understood by those skilled in the art.

Also, various implementations involve encoding. In an analogous way to the above discussion about "decoding", "encoding" as used in this application can encompass all or part of the processes performed, for example, on an input video sequence in order to produce an encoded bitstream or signal. In various embodiments, such processes include one or more of the processes typically performed by an encoder, for example, partitioning, differential encoding, transformation, quantization, and entropy encoding. In various embodiments, such processes also, or alternatively, include processes performed by an encoder of various implementations described in this application.

As further examples, in one embodiment "encoding" refers only to entropy encoding, in another embodiment "encoding" refers only to differential encoding, and in another embodiment "encoding" refers to a combination of differential encoding and entropy encoding. Whether the phrase "encoding process" is intended to refer specifically to a subset of operations or generally to the broader encoding process will be clear based on the context of the specific descriptions and is believed to be well understood by those skilled in the art.

Note that the syntax elements as used herein are descriptive terms. As such, they do not preclude the use of other syntax element names.

When a figure is presented as a flow diagram, it should be understood that it also provides a block diagram of a corresponding apparatus. Similarly, when a figure is presented as a block diagram, it should be understood that it also provides a flow diagram of a corresponding method/process.

Various embodiments refer to rate distortion optimization. In particular, during the encoding process, the balance or trade-off between the rate and distortion is usually considered, often given the constraints of computational complexity. The rate distortion optimization is usually formulated as minimizing a rate distortion function, which is a weighted sum of the rate and of the distortion. There are different approaches to solve the rate distortion optimization problem. For example, the approaches can be based on an extensive testing of all encoding options, including all considered modes or coding parameters values, with a complete evaluation of their coding cost and related distortion of the reconstructed signal after coding and decoding. Faster approaches can also be used, to save encoding complexity, in particular with computation of an approximated distortion based on the prediction or the prediction residual signal, not the reconstructed one. Mix of these two approaches can also be used, such as by using an approximated distortion for only some of the possible encoding options, and a complete distortion for other encoding options. Other approaches only evaluate a subset of the possible encoding options. More generally, many approaches employ any of a variety of techniques to perform the optimization, but the optimization is not necessarily a complete evaluation of both the coding cost and related distortion.

The implementations and aspects described herein can be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus can be implemented in, for example, appropriate hardware, software, and firmware. The methods can be implemented in, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this document are not necessarily all referring to the same embodiment.

Additionally, this document may refer to "obtaining" various pieces of information. Obtaining the information can include one or more of, for example, determining the information, estimating the information, calculating the information, predicting the information, or retrieving the information from memory.

Further, this document may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this document may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Also, as used herein, the word "signal" refers to, among other things, indicating something to a corresponding decoder. For example, in certain embodiments the encoder signals a particular one of a plurality of parameters for refinement. In this way, in an embodiment the same parameter is used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling can be used without transmitting (implicit signaling) to simply allow the decoder to know and select the particular parameter. By avoiding transmission of any actual functions, a bit savings is realized in various embodiments. It is to be appreciated that signaling can be accomplished in a variety of ways. For example, one or more syntax elements, flags, and so forth are used to signal information to a corresponding decoder in various embodiments. While the preceding relates to the verb form of the word "signal", the word "signal" can also be used herein as a noun.

As will be evident to one of ordinary skill in the art, implementations can produce a variety of signals formatted to carry information that can be, for example, stored or transmitted. The information can include, for example, instructions for performing a method, or data produced by one of the described implementations. For example, a signal can be formatted to carry the bitstream or signal of a described embodiment. Such a signal can be formatted, for example, as an electromagnetic wave (for example, using a radio frequency portion of spectrum) or as a baseband signal. The formatting can include, for example, encoding a data stream and modulating a carrier with the encoded data stream. The information that the signal carries can be, for example, analog or digital information. The signal can be transmitted over a variety of different wired or wireless links, as is known. The signal can be stored on a processor-readable medium.

Various embodiments have been described. Embodiments may include any of the following features or entities, alone or in any combination, across various different claim categories and types:

- Applying refinement that does not depend on neighboring reconstructed samples.
- Applying refinement based on global functions having one or more refinement parameters transmitted in a bitstream.
- Providing in the encoder and/or decoder a mode comprising a cross-component refinement of the chroma components.
- Providing in the encoder and/or decoder a mode comprising an intra-component refinement of a luma component.
- Enabling activation of refinement per block in the decoder and/or encoder.

Apply refinement using several functions for a particular component and selecting the refinement functions on a block basis.

Enabling in the decoder and/or encoder selection per block of the refinement parameters to apply to a block among a set of possible parameters coded in the bitstream or signal.

Applying refinement to a reconstructed signal on a per block basis.

Including a refinement step as an in-loop or out-of-loop filter for improving the reconstructed signal after decoding.

Basing refinement in the decoder and/or encoder on refinement tables coded in the bitstream or signal.

Providing for reducing tables coding cost by avoiding redundant neutral values.

Inserting in the signaling syntax elements that enable the decoder to provide refinement as described herein.

Including in the syntax elements an identifier related to the refinement tables such as a tables pair identifier.

Providing a size limitation of refinement tables to reduce coding cost.

Including in the syntax elements one or more syntax elements indicating if the refinement information for a current block is copied from neighboring blocks.

Selecting, based on these syntax elements, the refinement to apply at the decoder.

A bitstream or signal that includes one or more of the described syntax elements, or variations thereof.

Inserting in the signaling syntax elements that enable the decoder to provide refinement in a manner corresponding to that used by an encoder.

Creating and/or transmitting and/or receiving and/or decoding a bitstream or signal that includes one or more of the described syntax elements, or variations thereof.

A TV, set-top box, cell phone, tablet, or other electronic device that performs refinement according to any of the embodiments described.

A TV, set-top box, cell phone, tablet, or other electronic device that performs refinement according to any of the embodiments described, and that displays (e.g. using a monitor, screen, or other type of display) a resulting image.

A TV, set-top box, cell phone, tablet, or other electronic device that tunes (e.g. using a tuner) a channel to receive a signal including an encoded image, and performs refinement according to any of the embodiments described.

A TV, set-top box, cell phone, tablet, or other electronic device that receives (e.g. using an antenna) a signal over the air that includes an encoded image, and performs refinement according to any of the embodiments described.

A computer program product storing program code that, when executed by a computer implements refinement in accordance with any of the embodiments described.

A non-transitory computer readable medium including executable program instructions causing a computer executing the instructions to implement refinement in accordance with any of the embodiments described.

Various other generalized, as well as particularized embodiments are also supported and contemplated throughout this disclosure. For example, at least one example of an embodiment comprises a method of encoding comprising obtaining a cost (i) for encoding a picture part based on applying a refinement mode to a reconstructed signal per block, wherein the refinement mode is based on a refinement parameter and (ii) for encoding the picture part using a mode other than the refinement mode; and encoding the picture part based on the cost.

Another example of at least one embodiment comprises an apparatus comprising one or more processors configured to obtain a cost for encoding a picture part based on applying a refinement mode to a reconstructed signal per block, wherein the refinement mode is based on a refinement parameter and for encoding the picture part without using the refinement mode, and encode the picture part based on the cost.

Another example of at least one embodiment comprises a method of decoding comprising obtaining an indication of a refinement mode being applied to a reconstructed signal per block during encoding of a picture part, wherein the refinement mode is based on a refinement parameter; and decoding the encoded picture part based on the indication.

Another example of at least one embodiment comprises an apparatus comprising one or more processors configured to obtain an indication of a refinement mode being applied to a reconstructed signal per block during encoding of an encoded picture part, wherein the refinement mode is based on a refinement parameter and decode the encoded picture part based on the indication.

Another example of at least one embodiment comprises a signal formatted to include data representing an encoded picture part; and data providing an indication of a refinement mode being applied to a reconstructed signal per block based on a refinement parameter during encoding of the encoded picture part.

Another example of at least one embodiment comprises a bitstream formatted to include data representing an encoded picture part; and data providing an indication of a refinement mode being applied to a reconstructed signal per block based on a refinement parameter during encoding of the encoded picture part.

In at least one embodiment as described herein involving a refinement mode, the refinement mode can comprise a component refinement.

In at least one embodiment as described herein involving a refinement mode, the refinement mode can comprise at least one of a cross-component refinement or an intra-component refinement.

In at least one embodiment as described herein involving a cross component refinement or an intra-component refinement, the cross-component refinement can comprise a cross-component chroma refinement and the intra-component refinement can comprise an intra-component luma refinement.

In at least one embodiment as described herein involving a refinement mode, the refinement mode can comprise enabling selection per block of a refinement parameter.

In at least one embodiment as described herein involving a refinement parameter, the refinement parameter can comprise one or more refinement parameters included in a refinement table.

In at least one embodiment as described herein involving encoding a picture part based on applying a refinement mode and a refinement parameter, the refinement parameter can be selected on a block basis from a plurality of refinement parameters based on an improvement in a cost when encoding the picture part using the refinement mode.

According to another embodiment, a method for encoding video data is presented, comprising obtaining a cost (i) for encoding a picture part using a refinement mode per block, the refinement mode being based on a refinement parameter and (ii) for encoding the picture part using a mode other than the refinement mode; and encoding the picture part based on the cost.

According to another embodiment, a method for decoding video data is presented, comprising obtaining an indication of use of a refinement mode per block based on a refinement parameter during encoding of an encoded picture part; and decoding the encoded picture part based on the indication.

According to another embodiment, apparatus for decoding video data is presented, comprising one or more processors configured to obtain an indication of use of a refinement mode per block based on a refinement parameter during encoding of an encoded picture part, and to decode the encoded picture part based on the indication.

According to another embodiment, a signal format is presented including data representing an encoded picture part; and data providing an indication of use of a refinement mode per block based on a refinement parameter during encoding of the encoded picture part.

According to another embodiment, a bitstream is presented formatted to include encoded video data, wherein the encoded video data are encoded by: obtaining a cost (i) for encoding a picture part using a refinement mode per block, the refinement mode being based on a refinement parameter and (ii) for encoding the picture part using a mode other than the refinement mode; and encoding the picture part based on the cost.

According to another embodiment, a refinement mode as described herein can comprise a component refinement.

According to another embodiment, a refinement mode as described herein can comprise a component refinement, wherein the component refinement comprises at least one of a cross component refinement and an inter-component refinement and an intra-component refinement.

According to another embodiment, a refinement mode as described herein can comprise an inter-component chroma refinement.

According to another embodiment, a refinement mode as described herein can comprise an intra-component luma refinement.

According to another embodiment, a refinement mode as described herein can comprise enabling selection per block of a refinement parameter.

According to another embodiment, a refinement mode as described herein can be based on a refinement parameter comprising one or more chroma refinement parameters included in a chroma refinement table.

According to another embodiment, a method, apparatus or signal in accordance with the present disclosure can include encoding and/or decoding video data using a refinement mode based on a refinement parameter, wherein the encoding and/or decoding comprises encoding and/or decoding a picture part and the refinement parameter based on an improvement in a cost when encoding and/or decoding the picture part using the refinement mode.

According to another embodiment, a method, apparatus or signal in accordance with the present disclosure can include encoding and/or decoding video data based on using a refinement mode during encoding and/or decoding and determining a cost associated with using the refinement mode, wherein the cost can comprise a rate distortion cost and determining the cost can comprise determining the rate distortion cost when encoding the picture part using the refinement mode.

In general, at least one embodiment of a device for encoding and/or decoding video data can comprise an apparatus as described herein and can include at least one of (i) an antenna configured to receive a signal, the signal including data representative of an image, (ii) a band limiter configured to limit the received signal to a band of frequencies that includes the data representative of the image, or (iii) a display configured to display the image.

In general, at least one embodiment of a device for encoding and/or decoding video data can comprise at least one of a television, a cell phone, a tablet, a set-top box, and a gateway device.

One or more of the present embodiments also provide a computer readable storage medium or a computer program product having stored thereon instructions for encoding or decoding video data according to the methods or the apparatuses described herewith. The present embodiments also provide a computer readable storage medium or a computer program product having stored thereon a bitstream generated according to the methods or the apparatuses described herewith. The present embodiments also provide methods and apparatuses for transmitting or receiving the bitstream generated according to methods or the apparatuses described herewith.

The invention claimed is:

1. A method comprising:
   decoding, at a block level of a slice of picture information, an indication of a filter to be applied to a reconstructed chroma component of a block of a plurality of blocks included in a picture part, wherein the filter is based on a filter parameter included in a filter parameter table selected from among a plurality of filter parameter tables; and
   decoding the picture part based on the indication.

2. A non-transitory computer readable medium storing executable program instructions to cause a computer executing the instructions to perform a method according to claim 1.

3. The method of claim 1, wherein the indication provides for selecting the filter parameter table from among the plurality of filter parameter tables.

4. The method of claim 1, wherein the filter is associated with a refinement mode, the refinement mode comprising at least one of a cross-component refinement or an intra-component refinement.

5. The method of claim 1, further comprising decoding an indication of a number of the plurality of filter parameter tables and decoding the plurality of filter parameter tables.

6. An apparatus comprising:
   one or more processors configured to:
   decode, at a block level of a slice of picture information, an indication of a filter to be applied to a reconstructed chroma component of a block of a plurality of blocks included in a picture part, wherein the filter is based on a filter parameter included in a filter parameter table selected from among a plurality of filter parameter tables, and
   decode the picture part based on the indication.

7. The apparatus of claim 6, wherein the indication provides for selecting the filter parameter table from among the plurality of filter parameter tables.

8. The apparatus of claim 6, further comprising:
   at least one of (i) an antenna configured to receive a signal, the signal including data representative of an image, (ii) a band limiter configured to limit the received signal to a band of frequencies that includes the data representative of the image, or (iii) a display configured to display the image.

9. The apparatus of claim 8, wherein the device apparatus further comprises at least one of a television, a cell phone, a tablet, a set-top box, and a gateway device.

10. The apparatus of claim 6, wherein the filter is associated with a refinement mode, the refinement mode comprising at least one of a cross-component refinement or an intra-component refinement.

11. The apparatus of claim 10, wherein the refinement parameter is selected on a block basis from a plurality of refinement parameters based on an improvement in a cost associated with encoding the picture part using the refinement mode.

12. The apparatus of claim 6, wherein the one or processors are further configured to decode an indication of a number of the plurality of filter parameter tables and to decode the plurality of filter parameter tables.

13. The apparatus of claim 6, wherein a given value of the indication indicates that no filter is to be applied to the reconstructed chroma component of the block.

14. The apparatus of claim 6, wherein the selected filter is applied in an in-loop refinement process.

15. A non-transitory computer readable medium storing encoded video data formatted to include:
data representing a picture part; and
data providing, at a block level of a slice of picture information, an indication of a filter parameter table selected from among a plurality of filter parameter tables, wherein a filter based on a filter parameter included in the filter parameter table is to be applied to a reconstructed chroma component of a block of a plurality of blocks included in the picture part.

16. The non-transitory computer readable medium of claim 15, wherein the encoded video data further includes an indication of a number of the plurality of filter parameter tables and coded data representative of the plurality of filter parameter tables.

17. A method comprising:
applying a filter to a reconstructed chroma component of a block of a plurality of blocks included in a slice of picture information included in a picture part during encoding of the picture part, wherein the filter is based on a filter parameter included in a filter parameter table selected from among a plurality of filter parameter tables; and
encoding video data including information representing the encoded picture part and including, at a block level of the slice, an indication of the selected filter parameter table.

18. The method of claim 17, wherein the indication provides for selecting the filter parameter table from among the plurality of filter parameter tables.

19. The method of claim 17, wherein a given value of the indication indicates that no filter is to be applied to the reconstructed chroma component of the block.

20. A non-transitory computer readable medium storing executable program instructions to cause a computer executing the instructions to perform a method according to claim 17.

21. The method of claim 17, wherein the filter is associated with a refinement mode, the refinement mode comprising at least one of a cross-component refinement or an intra-component refinement.

22. An apparatus comprising:
one or more processors configured to:
apply a filter to a reconstructed chroma component of a block of a plurality of blocks included in a slice of picture information included in a picture part during encoding of the picture part, wherein the filter is based on a filter parameter included in a filter parameter table selected from among a plurality of filter parameter tables; and
encode video data including information representing the encoded picture part and including, at a block level of the slice, an indication of the selected filter parameter table.

23. The apparatus of claim 22, wherein the indication provides for selecting the filter parameter table from among the plurality of filter parameter tables.

24. The apparatus of claim 22, wherein a given value of the indication indicates that no filter is to be applied to the reconstructed chroma component of the block.

25. The apparatus of claim 22, wherein the filter is associated with a refinement mode, the refinement mode comprising at least one of a cross-component refinement or an intra-component refinement.

26. The apparatus of claim 25, wherein the filter parameter is selected on a block basis from a plurality of filter parameters based on an improvement in a cost associated with encoding the picture part using the refinement mode.

* * * * *